(12) United States Patent
Kim et al.

(10) Patent No.: US 11,521,619 B2
(45) Date of Patent: Dec. 6, 2022

(54) SYSTEM AND METHOD FOR MODIFYING SPEECH RECOGNITION RESULT

(71) Applicant: SAMSUNG ELECTRONICS CO., LTD., Suwon-si (KR)

(72) Inventors: Chanwoo Kim, Suwon-si (KR); Dhananjaya N. Gowda, Suwon-si (KR); Abhinav Garg, Suwon-si (KR); Kyungmin Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/990,343

(22) Filed: Aug. 11, 2020

(65) Prior Publication Data
US 2021/0050017 A1    Feb. 18, 2021

Related U.S. Application Data

(60) Provisional application No. 62/886,027, filed on Aug. 13, 2019.

(30) Foreign Application Priority Data

Dec. 9, 2019   (KR) .......................... 10-2019-0162921

(51) Int. Cl.
*G10L 15/30* (2013.01)
*G10L 15/06* (2013.01)
(Continued)

(52) U.S. Cl.
CPC ............ *G10L 15/30* (2013.01); *G10L 15/063* (2013.01); *G10L 15/22* (2013.01); *G10L 19/008* (2013.01); *G10L 19/06* (2013.01)

(58) Field of Classification Search
CPC ....... G10L 15/16; G10L 15/22; G10L 15/197; G10L 15/30; G10L 15/063; G10L 19/008;
(Continued)

(56) References Cited

U.S. PATENT DOCUMENTS

| | | | |
|---|---|---|---|
| 7,729,904 B2* | 6/2010 | Bennett | G06F 40/237 |
| | | | 704/270.1 |
| 7,933,777 B2 | 4/2011 | Koll | |

(Continued)

FOREIGN PATENT DOCUMENTS

| | | |
|---|---|---|
| JP | 2000-348141 A | 12/2000 |
| JP | 4012143 B2 | 11/2007 |

(Continued)

OTHER PUBLICATIONS

Štajner, Sanja, and Sergiu Nisioi. "A detailed evaluation of neural sequence-to-sequence models for in-domain and cross-domain text simplification." Proceedings of the eleventh international conference on language resources and evaluation (LREC 2018). 2018.*

(Continued)

*Primary Examiner* — Matthew H Baker
(74) *Attorney, Agent, or Firm* — Sughrue Mion, PLLC

(57) ABSTRACT

Provided are a system and method for modifying a speech recognition result. The method includes: receiving, from a device, text output from an automatic speech recognition (ASR) model of the device; identifying at least one domain related to the received text; selecting, from among a plurality of text modification models included in the server, at least one text modification model corresponding to the identified at least one domain; and modifying the received text by using the selected at least one text modification model.

18 Claims, 18 Drawing Sheets

(51) Int. Cl.
    *G10L 15/22* (2006.01)
    *G10L 19/008* (2013.01)
    *G10L 19/06* (2013.01)

(58) Field of Classification Search
    CPC ............... G10L 19/06; G10L 2015/223; G10L 2015/228; G10L 15/18; G10L 15/01; G10L 15/26; G06F 16/3329; G06F 16/3332; G06F 16/3343; G06F 16/387; G06F 40/211
    See application file for complete search history.

(56) References Cited

U.S. PATENT DOCUMENTS

| | | |
|---|---|---|
| 8,249,877 B2 | 8/2012 | Koll |
| 9,131,369 B2 | 9/2015 | Ganong, III et al. |
| 9,171,541 B2 | 10/2015 | Kennewick et al. |
| 9,263,036 B1 | 2/2016 | Graves |
| 9,305,554 B2 | 4/2016 | Jagatheesan et al. |
| 9,430,465 B2 | 8/2016 | Waibel et al. |
| 9,520,126 B2 | 12/2016 | Kim et al. |
| 9,620,122 B2 | 4/2017 | VanBlon |
| 9,674,328 B2 | 6/2017 | Juneja |
| 9,886,952 B2 | 2/2018 | Choi et al. |
| 10,032,451 B1* | 7/2018 | Mamkina ............... G10L 15/01 |
| 10,127,908 B1 | 11/2018 | Deller et al. |
| 10,281,885 B1* | 5/2019 | Chiu ................ G06N 3/0445 |
| 10,366,692 B1 | 7/2019 | Adams et al. |
| 10,431,207 B2* | 10/2019 | Angkititrakul ...... G06N 3/0454 |
| 10,460,726 B2 | 10/2019 | Lee |
| 10,783,875 B2* | 9/2020 | Hosseini-Asl ........ G10L 15/063 |
| 11,158,307 B1* | 10/2021 | Ghias ..................... G10L 15/04 |
| 2005/0131686 A1 | 6/2005 | Yamamoto et al. |
| 2005/0182628 A1 | 8/2005 | Choi |
| 2010/0131277 A1 | 5/2010 | Nakano |
| 2013/0151250 A1 | 6/2013 | VanBlon |
| 2014/0012575 A1 | 1/2014 | Ganong, III et al. |
| 2015/0149167 A1 | 5/2015 | Beaufays et al. |
| 2017/0148431 A1 | 5/2017 | Catanzaro et al. |
| 2017/0256254 A1 | 9/2017 | Huang et al. |
| 2017/0372696 A1 | 12/2017 | Lee |
| 2018/0174589 A1 | 6/2018 | Choi et al. |
| 2018/0336884 A1* | 11/2018 | Sriram ................ G10L 15/183 |
| 2019/0057683 A1 | 2/2019 | Sak et al. |
| 2019/0180740 A1 | 6/2019 | Nandy et al. |
| 2019/0189115 A1 | 6/2019 | Hori et al. |
| 2019/0189124 A1 | 6/2019 | Tsunoo et al. |
| 2019/0244604 A1 | 8/2019 | Masataki et al. |

FOREIGN PATENT DOCUMENTS

| | | |
|---|---|---|
| JP | 2015-75706 A | 4/2015 |
| JP | 2019-120841 A | 7/2019 |
| KR | 10-2003-0012064 A | 2/2003 |
| KR | 10-2012-0110751 A | 10/2012 |
| KR | 10-2015-0087687 A | 7/2015 |
| KR | 10-1786533 B1 | 10/2017 |
| KR | 10-2018-0001889 A | 1/2018 |

OTHER PUBLICATIONS

Chiu, Chung-Cheng, et al. "State-of-the-art speech recognition with sequence-to-sequence models."2018 IEEE International Conference on Acoustics, Speech and Signal Processing (ICASSP). IEEE, 2018.*

Guo, Jinxi et al., "A Spelling Correction Model for End-to-End Speech Recognition", arXiv:1902.07178v1, [eess.AS], Feb. 19, 2019. (5 pages total).

International Search Report and Written Opinion dated Nov. 11, 2020 by the International Searching Authority in International Patent Application No. PCT/KR2020/010494 (PCT/ISA/220; PCT/ISA210; PCT/ISA/237).

International Search Report and Written Opinion dated Nov. 13, 2020 by the International Searching Authority in International Patent Application No. PCT/KR2020/010565 (PCT/ISA/220; PCT/ISA210; PCT/ISA/237).

International Search Report and Written Opinion dated Nov. 27, 2020 by the International Searching Authority in International Patent Application No. PCT/KR2020/010567 (PCT/ISA/220; PCT/ISA/210; PCT/ISA/237).

Hoon Kim, [kakaoAIreport], "Voice recognition method and kakaoi's voice engine, brunch", Aug. 31, 2017, pp. 1-6, Retrieved from the Internet.

Communication dated Feb. 5, 2021 issued by the European Patent Office in European Application No. 20190406.7.

Communication dated Apr. 12, 2022 issued by the European Patent Office in European Application No. 20851479.4.

Hannun et al., "Deep Speech: Scaling up end-to-end speech recognition", Baidu Research—Silicon Valley AI Lab, arXiv:1412.5567v2 [cs.CL], Dec. 19, 2014, XP055453713, pp. 1-12.

Communication dated Jul. 7, 2022, issued by the European Patent Office in European Application No. 20852027.0.

Communication dated Oct. 11, 2022, issued by the European Patent Office in European Application No. 20190406.7.

* cited by examiner

FIG. 16

ASR RESULT : TDDAY I WILL MEET GIL HONG NEAR YEOMTONG STATION TO SEE THE A VENGERS — 160

TEXT MODIFICATION MODEL OF DOMAIN 'LOCATION' → TDDAY I WILL MEET GIL HONG NEAR YEONGTONG STATION TO SEE THE A VENGERS — 161

TEXT MODIFICATION MODEL OF DOMAIN 'MOVIE' → TDDAY I WILL MEET GIL HONG NEAR YEOMTONG STATION TO SEE THE AVENGERS — 162

TEXT MODIFICATION MODEL OF DOMAIN 'CONTACTS' → TDDAY I WILL MEET GIL DONG NEAR YEOMTONG STATION TO SEE THE A VENGERS — 163

MODIFIED TEXT : TDDAY I WILL MEET GIL DONG NEAR YEONGTONG STATION TO SEE THE AVENGERS — 164

SYSTEM AND METHOD FOR MODIFYING SPEECH RECOGNITION RESULT

CROSS-REFERENCE TO RELATED APPLICATIONS

This application is based on and claims the benefit of U.S. Provisional Patent Application No. 62/886,027, filed on Aug. 13, 2019, in the United States Patent and Trademark Office, and claims priority under 35 U.S.C. § 119 to Korean Patent Application No. 10-2019-0162921, filed on Dec. 9, 2019, in the Korean Intellectual Property Office, the disclosures of which are herein incorporated by reference in their entireties.

BACKGROUND

1. Field

The disclosure relates to a system and method for modifying a speech recognition result, and more particularly, to a system and method for modifying a speech recognition result through interoperation of a device and a server.

2. Description of Related Art

Automatic speech recognition (ASR) is a technology for receiving a human voice utterance and converting the human voice utterance into text. Speech recognition is used in various electronic devices—such as a smartphone, an air conditioner, a refrigerator, and an artificial intelligence (AI) home assistant. For example, an apparatus detects a human voice utterance as an input, recognizes the received utterance by using a speech recognition model trained to recognize speech, and converts the recognized utterance into text. The text may be a final output of the apparatus.

Recently, deep neural network (DNN) algorithms have been used in various machine learning fields and performance of speech recognition has been improved. For example, in the field of speech recognition, performance has been greatly improved by using a neural network, and a speech recognition model (e.g., an ASR model) for speech recognition has been developed. As AI systems have been improved, recognition rates have been increased and user preferences have been more accurately understood, and thus existing rule-based smart systems have been gradually replaced with deep learning-based AI systems.

SUMMARY

Provided are a system and method that provide an output value of an automatic speech recognition (ASR) model of a device to a server and may modify the output value of the ASR model by using an artificial intelligence (AI) model of the server.

Provided are a system and method that modify a speech recognition result by using a text modification model corresponding to a domain related to an output value of an ASR model of a device.

Provided are a system and method that effectively apply text, which a server receives from a device, to text modification models related to a plurality of domains.

Provided are a system and method by which a server may effectively identify a domain related to text by using a plurality of domain identification modules related to a plurality of domains.

Additional aspects will be set forth in part in the description which follows and, in part, will be apparent from the description, or may be learned by practice of the presented embodiments of the disclosure.

According to an embodiment of the disclosure, a method, performed by a server, of modifying a speech recognition result provided from a device includes: receiving, from the device, output text from an automatic speech recognition (ASR) model of the device; identifying at least one domain related to subject matter of the output text; selecting, from among a plurality of text modification models included in the server, at least one text modification model of the at least one domain, wherein the at least one text modification model is an artificial intelligence (AI) model trained to analyze text related to the subject matter; modifying the output text to generate modified text using the at least one text modification model.

According to another embodiment of the disclosure, a server for modifying a speech recognition result provided from a device includes: a communication interface; a storage storing a program including one or more instructions; and a processor configured to execute the one or more instructions of the program stored in the storage to receive, from the device, output text from an automatic speech recognition (ASR) model of the device, identify at least one domain related to subject matter of the output text, select at least one text modification model of the at least one domain, wherein the at least one text modification model is an artificial intelligence (AI) model trained to analyze text related to the subject matter, from among a plurality of text modification models included in the server, modify the output text to generate modified text using the at least one text modification model, and provide the modified text to the device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16 is a diagram illustrating a server modifying text received from a device by using modified text output from a plurality of text modification models, according to an embodiment of the disclosure;

DETAILED DESCRIPTION

Figure 1:
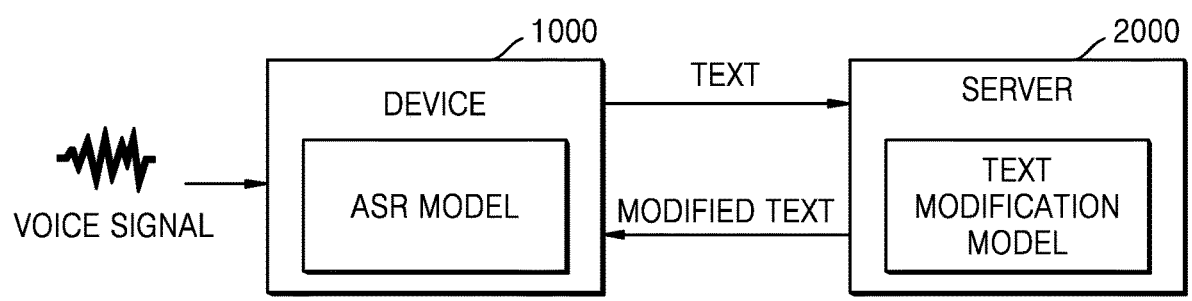
FIG. 1 is a block diagram illustrating a speech recognition system according to an embodiment of the disclosure.

Hereinafter, embodiments of the disclosure will be described in detail in order to enable one of ordinary skill in the art to easily embody and practice the disclosure with reference to the attached drawings. The disclosure may, however, be implemented in many different forms and should not be construed as being limited to the embodiments of the disclosure set forth herein. In the drawings, parts unnecessary to the description in the drawings are omitted for clarity of the disclosure, and like reference numbers denote like elements throughout.

Throughout the specification, it will be understood that when a part is referred to as being "connected" to another part, it may be "directly connected" to the other part or "electrically connected" to the other part with intervening elements therebetween. It will be further understood that when a part "includes" or "comprises" an element, unless otherwise defined, the part may further include other elements, not excluding the other elements.

Throughout the disclosure, the expression "at least one of a, b or c" indicates only a, only b, only c, both a and b, both a and c, both b and c, all of a, b, and c, or variations thereof.

The disclosure will now be described more fully with reference to the accompanying drawings, in which embodiments of the disclosure are shown.

FIG. 1 is a block diagram illustrating a speech recognition system according to an embodiment of the disclosure.

Referring to FIG. 1, a speech recognition system according to an embodiment of the disclosure includes a device 1000 and a server 2000.

The device 1000 may include an automatic speech recognition (ASR) model, and the server 2000 may include a text modification model. The device 1000 may recognize a voice input of a user by using the ASR model and may output text. The server 2000 may modify the text generated by the device 1000.

An ASR model is a speech recognition model for recognizing a voice by using an integrated neural network, and may output text from a voice input of a user. The ASR model may be an artificial intelligence (AI) model including, for example, an acoustic model, a pronunciation dictionary, and a language model. Alternatively, the ASR model may be an end-to-end speech recognition model having a structure including an integrated neural network without separately including, for example, an acoustic model, a pronunciation dictionary, and a language model.

Because an end-to-end ASR model uses an integrated neural network, the end-to-end ASR model may convert a voice into text without a process of recognizing a phoneme from the voice and then converting the phoneme into text. Text may include at least one character. A character refers to a symbol used to describe a human language in a visible form. Examples of characters may include Korean letters (Hangul), alphabets, Chinese characters, numbers, phonetic marks, punctuation marks, and other symbols.

Also, for example, text may include a character string. A character string refers to a sequence of characters. For example, text may include at least one grapheme. A grapheme is a smallest unit including at least one character and representing sound. For example, in an alphabetic writing system, one character may become a grapheme, and a character string may refer to a sequence of graphemes. For example, text may include a morpheme or a word. A morpheme is a smallest meaningful unit including at least one grapheme. A word is an independent linguistic unit having a grammatical function and including at least one morpheme a grammatical function.

The device 1000 may receive a voice input of a user, may recognize the received voice input by using the ASR model, and may provide text that is an output value of the ASR model to the server 2000. Also, the server 2000 may receive the text that is the output value of the ASR model from the device 1000 and may modify the received text. The server 2000 may identify a degree to which the text that is the output value of the ASR model is related to a specific domain registered in the server 2000. The server may modify the text by using a text modification model of the identified domain. Also, the server 2000 may provide modified text to the device 1000.

A text modification model that is an AI model trained to modify at least a part of text that is a speech recognition result may include, for example, a sequence-to-sequence mapper. A text modification model may be an AI model trained by using text output from an ASR model and preset ground truth text. A text modification model may be an AI model trained for each domain. For example, a text modification model of a first domain may be trained by using text that is an output value of an ASR model and ground truth text specialized for the first domain. Also, for example, a text modification model of a second domain may be trained by using the text that is the output value of the ASR model and ground truth text specialized for the second domain.

A text modification model may be an AI model trained by using pieces of text output from multiple types of ASR models and preset pieces of ground truth text. In this case, because the text modification model is trained by using the pieces of text output from the multiple types of ASR models, an accurate output value (e.g., modified text) may be provided regardless of which type of ASR model text input to the text modification model is output from.

For example, modified text may include at least one of a modified character, a modified grapheme, a modified morpheme, or a modified word. For example, when text output from an ASR model includes a mistake, modified text may include a character corrected from the mistake. Also, for example, when text output from an ASR model includes a word with an incorrect meaning inappropriate for the context, modified text may include a word with a correct meaning that replaces the word with incorrect meaning. Also, for example, modified text may be generated by replacing a specific word in text output from an ASR model with a similar word.

Examples of the device 1000 may include, but are not limited to, a smartphone, a tablet personal computer (PC), a PC, a smart TV, a mobile phone, a personal digital assistant (PDA), a laptop, a media player, a micro-server, a global positioning system (GPS) device, an e-book terminal, a digital broadcasting terminal, a navigation, a kiosk, an MP3 player, a digital camera, a home appliance, and other mobile or non-mobile computing devices. Also, the device 1000 may be a wearable device, such as a watch, glasses, a hair band, or a ring having a communication function and a data processing function. However, the disclosure is not limited thereto, and the device 1000 may include any type of device capable of transmitting data and receiving data through a network 200 to the server 2000 and from the server 2000 for performing speech recognition.

Examples of the network 200 include a local area network (LAN), a wide area network (WAN), a value added network (VAN), a mobile radio communication network, a satellite communication network, and a combination thereof. The network 200 is a data communication network in a comprehensive sense for enabling network constituent elements of FIG. 1 to smoothly communicate with each other and includes a wired Internet, a wireless Internet, and a mobile wireless communication network.

Figure 2:
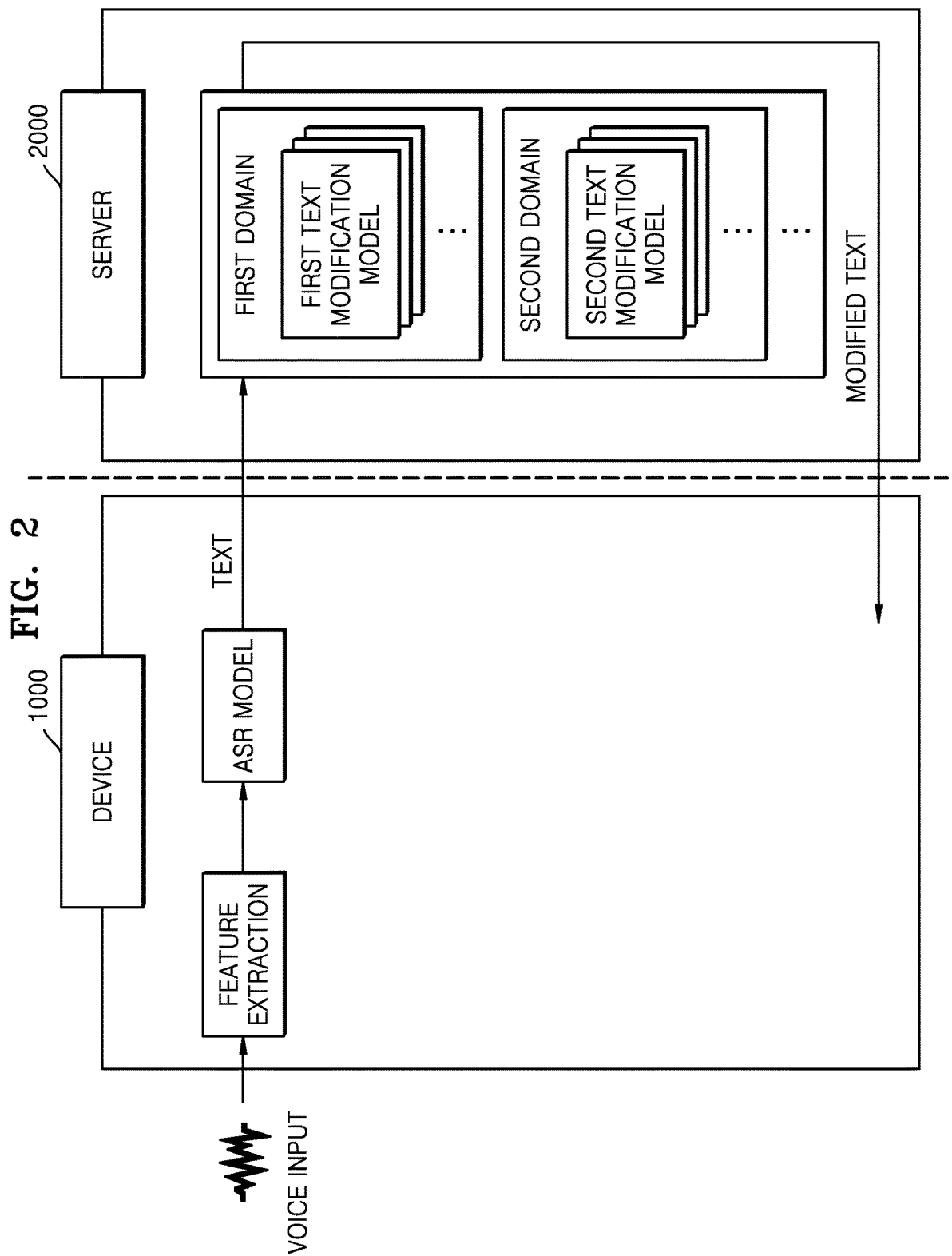
FIG. 2 is a block diagram illustrating a speech recognition system including text modification models related to a plurality of domains, according to an embodiment of the disclosure.

FIG. 2 is a block diagram illustrating a speech recognition system including text modification models related to a plurality of domains, according to an embodiment of the disclosure.

Referring to FIG. 2, the device 1000 may include an ASR model. The server 2000 may include text modification models for modifying text output from the ASR model. For example, the server 2000 may include a first text modification model corresponding to a first domain and a second text modification model corresponding to a second domain.

The device 1000 may obtain a feature vector by extracting a feature from a voice input, and may provide the obtained feature vector as input to the ASR model. The device 1000 may provide an output value output from the ASR model to the server 2000. The output value output from the ASR model may include text in various forms. For example, the device 1000 may provide sentence-unit text to the server 2000 or may provide a text stream to the server 2000, but the system is not limited thereto.

The server 2000 may receive the text from the device 1000, and may select a (text) domain related to the received text. A domain indicates a field related to subject matter of an input voice and may be pre-set according to, for example, the meaning of the input voice or the attribute of the input voice. A domain may be classified according to, for example, a service related to an input voice when the subject matter of the input device is a service. Also, a text modification model may be trained for each domain, and in this case, the text modification model trained for each domain may be a model trained by using input text related to the domain and ground truth text corresponding to the input text. The server 2000 may select at least one of a plurality of preset domains, and may select at least one of text modification models corresponding to the selected domain. Also, the server 2000 may obtain modified text by inputting the text received from the device 1000 to the text modification model of the selected domain. The server 2000 may provide the modified text to the device 1000.

The server 2000 may provide various types of voice assistant services to the device 1000 by using the modified text. A voice assistant service may be a service of providing conversation with a user who provides commands or questions to the voice assistant service. In a voice assistant service, a response message may be provided to a user as if a person directly talks to the user in consideration of the user's situation, a condition of a device, etc. In addition, in a voice assistant service, information required by a user may be appropriately generated and provided to the user as if a personal assistant of the user provides the information. A voice assistant service may provide to the user information or a function requested by the user, in conjunction with various services, such as a broadcasting service, a content sharing service, a content providing service, a power management service, a game service, a chat service, a document creating service, a search service, a call service, a photographing service, a transportation recommendation service, and a video playback service.

Figure 3:
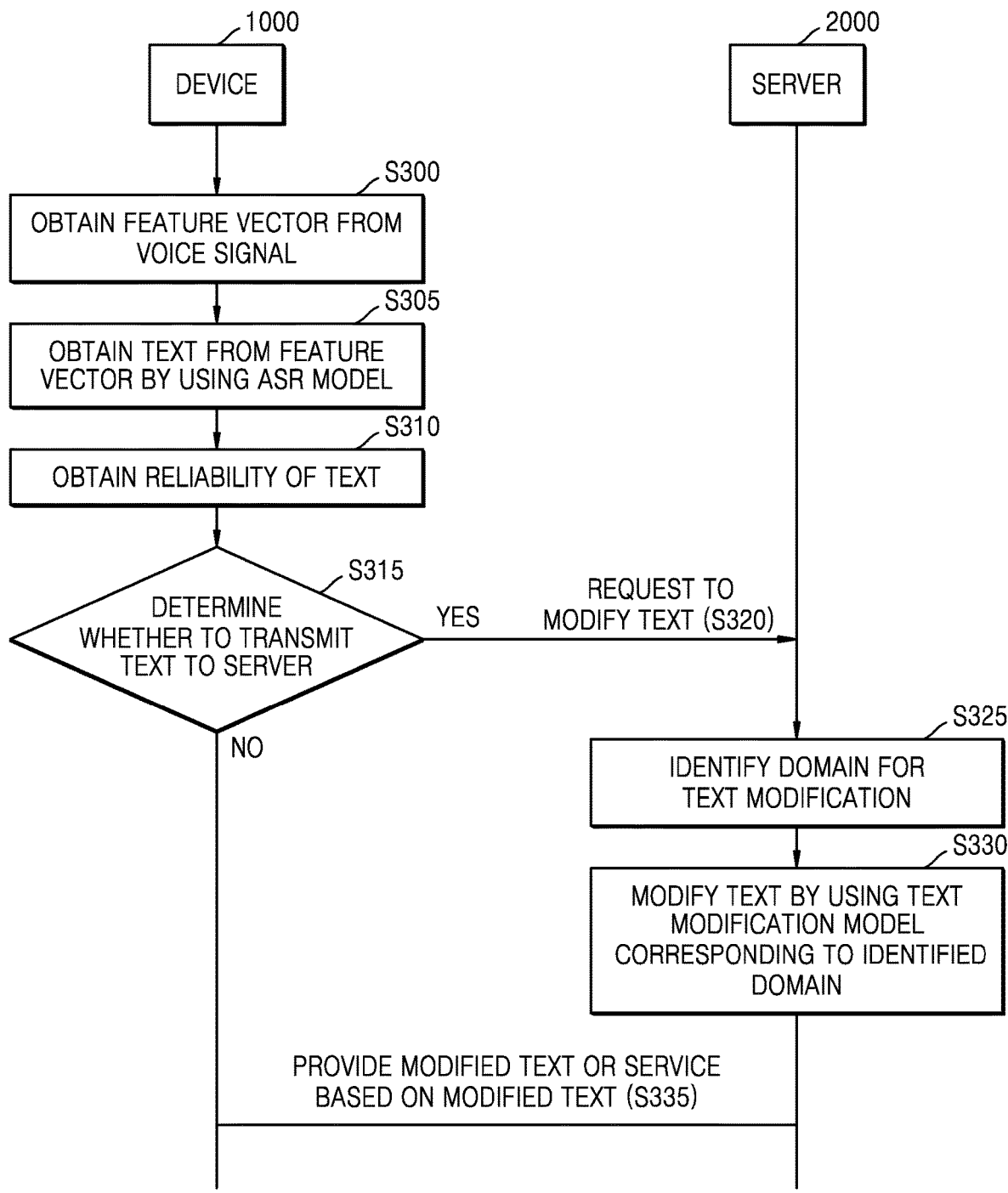
FIG. 3 is a flowchart illustrating a method of a device and a server in a speech recognition system recognizing a voice input and obtaining modified text, according to an embodiment of the disclosure.

FIG. 3 is a flowchart illustrating a method of a device and a server in a speech recognition system recognizing a voice input and obtaining modified text, according to an embodiment of the disclosure.

The device 1000 may perform an operation in FIG. 3 by executing instructions stored in a memory of the device 1000. For example, the device 1000 may perform an operation in FIG. 3 by executing at least one of a speech recognition evaluation module 1430, a domain identification module 1440, a natural language understanding (NLU) determination module 1450, a domain registration module 1460, an ASR model 1410, or an NLU model 1420 of FIG. 18, which will be described below. However, the disclosure is not limited thereto, and the device 1000 may execute other programs stored in the memory to perform other operations associated with the programs stored in the memory.

Also, the server 2000 may perform an operation in FIG. 3 by executing instructions stored in a memory of the server 2000. For example, the server 2000 may perform an operation by executing at least one of a domain management module 2310, a voice analysis management module 2340, a text modification module 2320, or an NLU module 2330 of FIG. 17, which will be described below. However, the disclosure is not limited thereto, and the server 2000 may execute other programs stored in the storage to perform a certain operation of the server 2000.

In operation S300, the device 1000 may obtain a feature vector from a voice signal. The device 1000 may receive a voice input (e.g., utterance) of a user through a microphone, and may generate the feature vector indicating a feature of the voice signal by using the voice signal obtained through the microphone. When noise is included in the voice signal, the device 1000 may remove the noise in the voice signal, and may obtain the feature vector from the voice signal from which the noise is removed. Also, for example, the device 1000 may extract the feature vector indicating the feature of the voice signal from the voice signal. For example, the device 1000 may receive data indicating the feature vector of the voice signal from an external device.

In operation S305, the device 1000 may obtain text from the feature vector by using an ASR model. The device 1000 may provide the feature vector as input to the ASR model in the device 1000 to recognize a voice of the user. When a plurality of ASR models are included in the device 1000, the device 1000 may select one of the plurality of ASR models, and may convert the feature vector into a format suitable for the selected ASR model. The ASR model of the device 1000 may be an AI model including, for example, an acoustic model, a pronunciation dictionary, and a language model. Alternatively, the ASR model of the device 1000 may be an end-to-end speech recognition model having a structure including an integrated neural network without separately including, for example, an acoustic model, a pronunciation dictionary, and a language model.

In operation S310, the device 1000 may obtain a reliability of the text. A reliability of text may be a value indicating a degree to which the text output from an ASR model is matched to an input voice, and may include, for example, but not limited to, a confidence score. Also, a reliability of text may be related to a probability that the text will match an input voice. For example, the reliability of the text may be calculated based on at least one of likelihoods of a plurality of pieces of estimated text output from the ASR model of the device 1000 or posterior probabilities that at least one character in the text will be replaced by another character. For example, the device 1000 may calculate the reliability based on a likelihood output as a result of Viterbi decoding. Alternatively, for example, the device 1000 may calculate the reliability based on posterior probabilities output from a softmax layer in the end-to-end ASR model. For example, the device 1000 may determine a plurality of pieces of estimated text estimated in a speech recognition process of the ASR model of the device 1000, and may calculate the reliability of the text based on a correlation of characters in the plurality of pieces of estimated text. Also, for example, the device 1000 may obtain the reliability of the text by using the speech recognition evaluation module 1430 of FIG. 18.

In operation S315, the device 1000 may determine whether to transmit the text to the server 2000. The device 1000 may determine whether to transmit the text to the server 2000, by comparing the reliability of the text with a preset threshold value. When the reliability of the text is equal to or greater than the preset threshold value, the device 1000 may determine not to transmit the text to the server 2000. Also, when the reliability of the text is less than the preset threshold value, the device 1000 may determine to transmit the text to the server 2000.

Also, the device 1000 may determine whether to transmit the text to the server 2000, based on at least one text having a high reliability from among the plurality of pieces of estimated text in the speech recognition process of the ASR model. For example, the plurality of pieces of estimated text estimated in the speech recognition process of the ASR model include first estimated text having a high reliability and second estimated text having a high reliability. If a difference between the reliability of the first estimated text and the reliability of the second estimated text is equal to or less than a certain threshold value, the device 1000 may determine to transmit the text to the server 2000. Also, for example, the plurality of pieces of estimated text estimated in the speech recognition process of the ASR model include first estimated text having a high reliability and second estimated text having a high reliability. If a difference between the reliability of the first estimated text and the reliability of the second estimated text is greater than the certain threshold value, the device 1000 may determine not to transmit the text to the server 2000.

When it is determined in operation S315 that the text is to be transmitted to the server 2000, in operation S320, the device 1000 may request the server 2000 to modify the text.

The device 1000 may transmit the text to the server 2000 and may request the server 2000 for modified text. In this case, for example, the device 1000 may transmit a type of the ASR model and an identification value of the ASR model in the device 1000 to the server 2000 while requesting the server 2000 for the modified text, but the disclosure is not limited thereto.

Also, for example, the device 1000 may provide domain information related to the text output from the ASR model of the device 1000 to the server 2000 while requesting the server 2000 for the modified text. Domain information that is information for identifying a domain may include, but is not limited to, a name of the domain and an identifier of the domain. The device 1000 may identify the domain related to the text by using the domain identification module 1440 in the device 1000. For example, the device 1000 may identify the domain related to the text, based on a domain reliability of the text output from the ASR model of the device 1000. A domain reliability may be a value indicating a degree to which at least part of text is related to a specific domain. For example, the device 1000 may calculate a confidence score indicating a degree to which the text output from the ASR model is related to a domain pre-registered in the device 1000. Also, the device 1000 may identify the domain related to the text, based on the calculated domain reliability. The device 1000 may identify the domain related to the text based on rules or may obtain the domain reliability related to the text by using an AI model trained for domain identification. Also, for example, the AI model for domain identification may be a part of an NLU model, or a model separate from the NLU model.

When it is determined in operation S315 that the text is not to be transmitted to the server 2000, the device 1000 may provide a voice assistant service by using the text output from the ASR model. For example, when the reliability of the text output from the ASR model is equal to or greater than a preset threshold value, the device 1000 may perform operations for the voice assistant service by using the text output from the ASR model. Also, for example, the plurality of pieces of estimated text estimated in the speech recognition process of the ASR model include first estimated text having a highest reliability and second estimated text having a second highest reliability. If a difference between the reliability of the first estimated text and the reliability of the second estimated text is greater than a certain threshold value, the device 1000 may provide the voice assistant service by using the first estimated text having the highest reliability.

For example, the device 1000 may display the text output from the ASR model on a screen. For example, the device 1000 may perform an operation for conversation with the user based on the text output from the ASR model. Also, for example, the device 1000 may provide, through conversation with the user based on the text output from the ASR model, various services, such as a broadcasting service, a content sharing service, a content providing service, a power management service, a game service, a chat service, a document creating service, a search service, a call service, a photographing service, a transportation recommendation service, and a video playback service.

In operation S325, the server 2000 may identify a domain for text modification. When the server 2000 receives the domain information from the device 1000, the server 2000 may identify the domain for text modification from the domain information. Alternatively, when the server 2000 does not receive the domain information from the device 1000, the server 2000 may identify a domain related to the text received from the device 1000 by using a domain identification module 2312 in the server 2000. For example, in this case, the server 2000 may identify the domain related to the text, based on the domain reliability of the text received from the device 1000. For example, the server 2000 may calculate a confidence score indicating a degree to which the text received from the device 1000 is related to a domain that is pre-registered for text modification. Also, the server 2000 may identify the domain related to the text received from the device 1000, based on the domain reliability calculated for the pre-registered domain. The server 1000 may identify the domain related to the text based on rules or may obtain the domain reliability related to the text by using an AI model trained for domain identification. Also, for example, the AI model for domain identification may be a part of an NLU model or a model separate from the NLU model.

In operation S330, the server 2000 may modify the text by using a text modification model corresponding to the determined domain. The server 2000 may include a plurality of text modification models corresponding to a plurality of domains, and may select a text modification model corresponding to the domain identified in operation S325 from among the plurality of text modification models.

The server 2000 may select a domain corresponding to the domain identified in operation S325 form among domains registered in the server 2000, and may select a text modification model of the selected domain. The domain corresponding to the domain identified in operation S325 from among the domains registered in the server 2000 may be a domain that is the same as or similar to the identified domain. For example, when the plurality of domains registered in the server 2000 are "movie," "location," and "region name," and the domain identified in operation S325 is 'movie,' the server 2000 may select "movie." For example, when the plurality of domains in the server 2000 are "video content," "location," and "region name" and the domain identified in operation S325 is 'movie,' the server 2000 may select "video content." In this case, information about an identification value similar to an identification value of each domain of the server 2000 may be stored in the server 2000.

Also, the server 2000 may generate modified text by using the selected text modification model. The server 2000 may input the text to the selected text modification model, and may obtain the modified text output from the text modification model. In this case, the server 2000 may preprocess a format of the text received from the device 1000 to be suitable for the text modification model, and may input a processed value to the text modification model.

When the text received from the device 1000 is related to a plurality of domains, the server 2000 may select a plurality of text modification models corresponding to the plurality of domains for text modification. In this case, the server 2000 may obtain the modified text to be provided to the device 1000, from pieces of modified text output from the plurality of text modification models. For example, when the server 2000 generates a plurality of pieces of modified text by using the plurality of text modification models, the server 2000 may compare reliabilities of the plurality of pieces of modified text and may determine modified text having a high or highest reliability as the modified text to be provided to the device 1000. A reliability of the modified text may be a value indicating a degree to which the modified text matches an input voice, and may include, for example, but is not limited to, a confidence score.

Also, for example, the server 2000 may obtain the modified text to be provided to the device 1000, by extracting some pieces of text from pieces of modified text output from the plurality of text modification models and combining the extracted some pieces of text. For example, when the server 2000 generates first modified text and second modified text by using the plurality of text modification models and a reliability of part of the first modified text and a reliability of part of the second modified text are high, the server 2000 may obtain the modified text to be provided to the device 1000 by combining the part of the first modified text and the part of the second modified text to generate text of higher reliability than either the first modified text or the second modified text.

In operation S335, the server 2000 may provide the modified text to the device 1000.

Although the device 1000 requests the server 2000 for the modified text and the server 2000 provides the modified text to the device 1000 in FIG. 3, the disclosure is not limited thereto. The server 2000 may provide various types of voice assistant services to the device 1000 by using the modified text. A voice assistant service may be a service for providing conversation with a user. In a voice assistant service, a response message may be provided to a user by the voice assistant as if a person directly talks to the user in consideration of the user's situation and a condition of a device. In addition, in a voice assistant service, information required by a user may be appropriately generated and provided to the user as if a personal assistant of the user provides the information. A voice assistant service may provide information or a function required by a user to the user, in conjunction with various services, such as a broadcasting service, a content sharing service, a content providing service, a power management service, a game service, a chat service, a document creating service, a search service, a call service, a photographing service, a transportation recommendation service, and a video playback service.

In this case, the server 2000 may provide information for performing conversation with the user to the device 1000, by using a natural language understanding (NLU) model, a dialog manager (DM) model, a natural language generating (NLG) model, etc. in the server 2000. Thereby, the server 2000 may provide the voice assistant service based on the text. Also, the server 2000 may directly control another device based on a result obtained by interpreting the text. Also, the server 2000 may generate control information for enabling the device 1000 to control another device based on a result obtained by interpreting the modified text, and may provide the generated control information to the device 1000.

Figure 4:
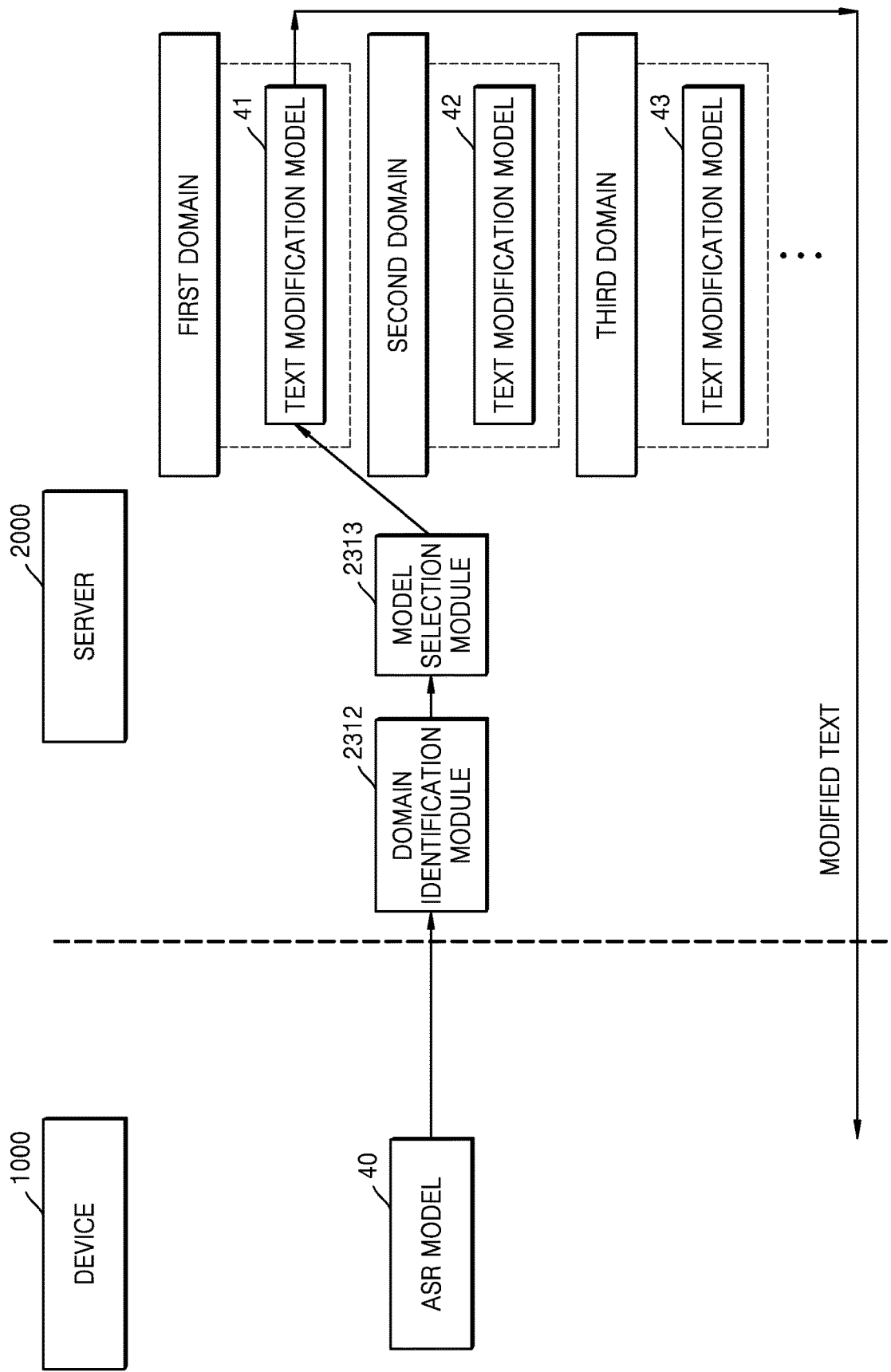
FIG. 4 is a diagram illustrating a server identifying a domain related to text and selecting a text modification model of the domain related to the text, according to an embodiment of the disclosure.

FIG. 4 is a diagram illustrating a server identifying a domain related to text and selecting a text modification model of the domain related to the text, according to an embodiment of the disclosure.

Referring to FIG. 4, text output from an ASR model 40 of the device 1000 may be provided to the domain identification module 2312 in the server 2000. The server 2000 may identify a domain related to the text received from the device 1000, by using the domain identification module 2312 in the server 2000. In this case, the server 2000 may identify the domain related to the text, based on a domain reliability of the text received from the device 1000. For example, the server 2000 may calculate a confidence score indicating a degree to which the text received from the device 1000 is related to a domain that is pre-registered for text modification. The domain identification module 2312 that is an AI model trained for domain identification may output the domain reliability by using the text as an input value. Also, for example, the domain identification module 2312 may be a part of an NLU model or a model separate from the NLU model. Alternatively, the domain identification module 2312 may identify the domain related to the text based on rules.

In FIG. 4, the domain identification module 2312 may obtain, for example, a first domain reliability of a first domain, a second domain reliability of a second domain, and a third domain reliability of a third domain.

Also, a model selection module 2313 of the server 2000 may select a text modification model for text modification. For example, the model selection module 2313 may compare the first domain reliability of the first domain, the second domain reliability of the second domain, and the third domain reliability of the third domain, and may determine that the first domain reliability of the first domain is a highest domain reliability. Also, the model selection module 2313 may select a text modification model 41 of the first domain from among a plurality of text modification models 41, 42, and 43 in the server 2000.

The server 2000 may input the text received from the device 1000 to the text modification model 41 of the first domain, and may obtain modified text output from the text modification model 41. Next, the server 2000 may provide the modified text to the device 1000.

Figure 5:
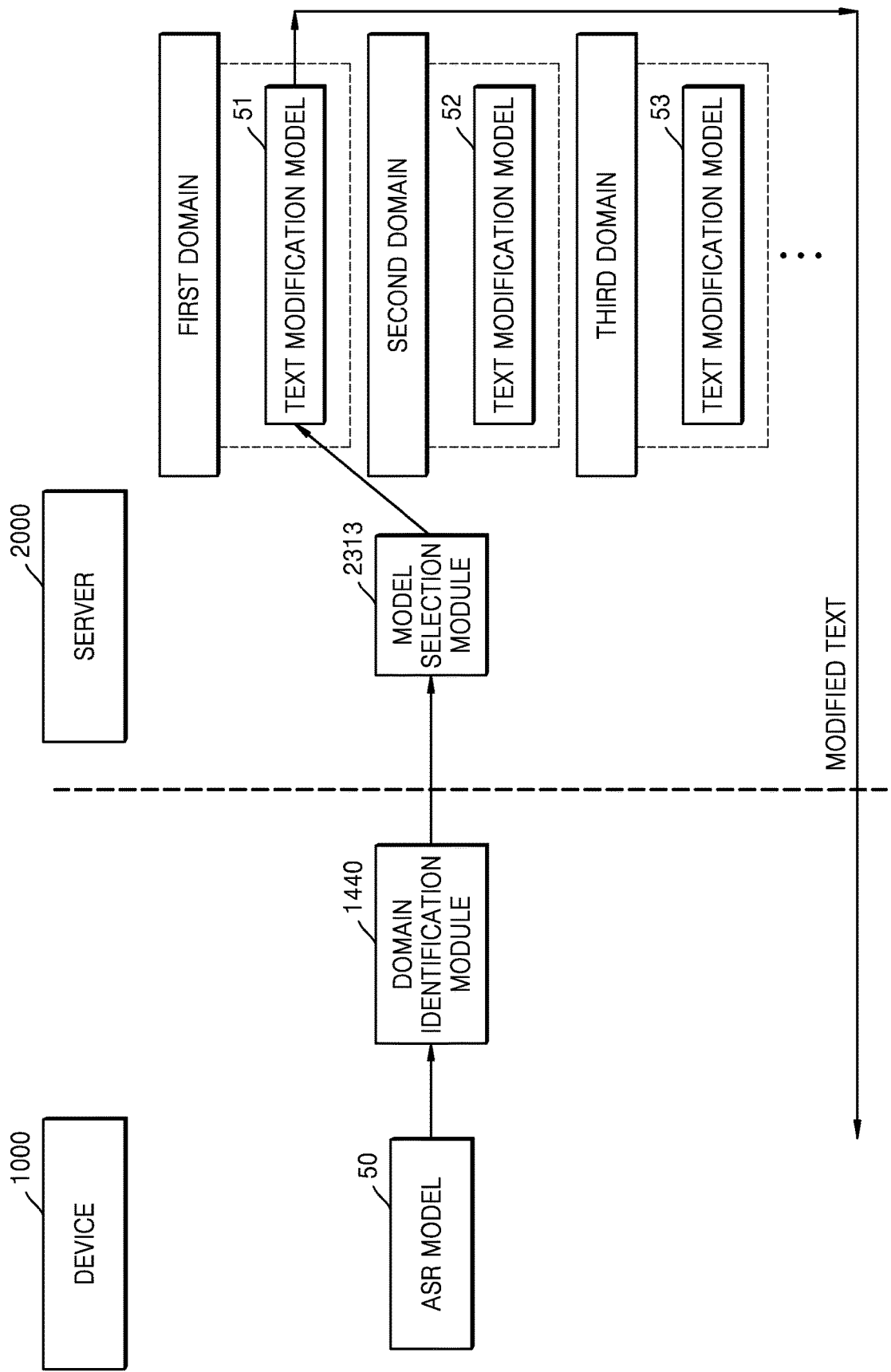
FIG. 5 is a diagram illustrating a device identifying a domain related to text and a server selecting a text modification model of the domain related to the text, according to an embodiment of the disclosure.

FIG. 5 is a diagram illustrating a device identifying a domain related to text and a server selecting a text modification model of the domain related to the text, according to an embodiment of the disclosure.

Referring to FIG. 5, text output from an ASR model 50 of the device 1000 may be provided to the domain identification module 1440 in the device 1000. The device 1000 may identify a domain related to the text output from the ASR model 50, by using the domain identification module 1440 in the device 1000. In this case, the device 1000 may identify the domain related to the text, based on a domain reliability of the text output from the ASR model 50. For example, the device 1000 may calculate a confidence score indicating a degree to which the text output from the ASR model 500 is related to a pre-registered domain. The domain identification module 1440 that is an AI model trained for domain identification may output the domain reliability by using the text as an input value. Also, for example, the domain identification module 1440 may be a part of an NLU model or a model separate from the NLU model. Alternatively, the domain identification module 1440 may identify the domain related to the text based on rules.

In FIG. 5, the domain identification module 1440 may obtain, for example, a first domain reliability of a first domain, a second domain reliability of a second domain, and a third domain reliability of a third domain.

Also, the device 1000 may provide the text output from the ASR model 50 to the server 2000. Also, the device 1000 may provide the domain reliability obtained by the domain identification module 1440 to the server 2000. Alternatively, the device 1000 may identify the domain related to the text based on the domain reliability obtained by the domain identification module 1440, and may provide identification information of the identified domain to the server 2000.

The model selection module 2313 of the server 2000 may select a text modification model for text modification. When the device 1000 provides the domain reliability to the server 2000, the model selection module 2313 may compare, for example, the first domain reliability of the first domain, the second domain reliability of the second domain, and the third domain reliability of the third domain, and may determine that the domain reliability of the first domain is a highest domain reliability. Also, the model selection module 2313 may select a text modification model 51 of the first domain from among a plurality of text modification models 51, 52, and 53 in the server 2000 corresponding to the domain having the highest domain reliability.

Alternatively, when the device 1000 provides an identification value of the domain related to the text to the server 2000, the model selection module 2313 may select the text modification model 51 of the first domain according to a domain identification value received from the device 1000.

The server 2000 may input the text received from the device 1000 to the text modification model 51 of the first domain, and may obtain modified text output from the text modification model 51. Next, the server 2000 may provide the modified text to the device 1000.

Figure 6:
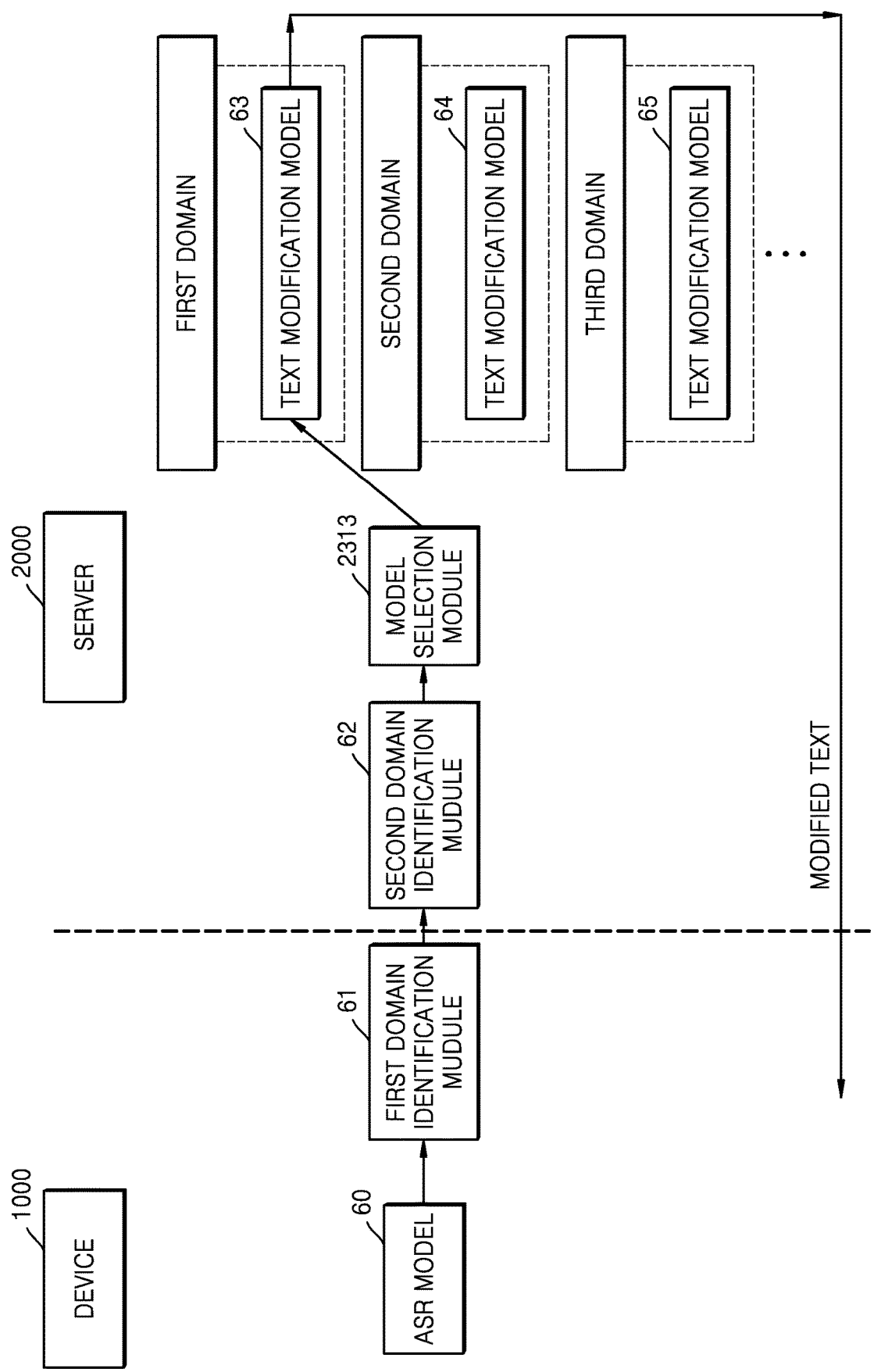
FIG. 6 is a diagram illustrating a server and a device identifying a domain related to text and the server selecting a text modification model of the domain related to the text, according to an embodiment of the disclosure.

FIG. 6 is a diagram illustrating a server and a device identifying a domain related to text and the server selecting a text modification model of the domain related to the text, according to an embodiment of the disclosure.

Referring to FIG. 6, text output from an ASR model 60 of the device 1000 may be provided to a first domain identification module 61 in the device 1000. The first domain identification module 61 may be an identification module 1440. The device 1000 may obtain a first domain reliability of the text output from the ASR model 60 by using the first domain identification module 61 in the device 1000. Also, the device 1000 may provide the text output from the ASR model 60 and the first domain reliability obtained from the first domain identification module 61 to the server 2000.

The server 2000 may receive the text from the device 1000, and may provide the received text to a second domain identification module 62 in the server 2000. The second domain identification module 62 may be the domain identification module 2312. The server 2000 may obtain a second domain reliability of the text received from the device 1000, by using the second domain identification module 62 in the server 2000.

Next, the model selection module 2313 of the server 2000 may select a text modification model for text modification, based on the first domain reliability and the second domain reliability. For example, the model selection module 2313 may select a first domain related to the text from among domains registered in the server 2000 based on a weighted sum of the first domain reliability and the second domain reliability, and may select a text modification module 63 of the selected domain. Also, for example, in this case, because the first domain reliability and the second domain reliability are normalized, weight values may be respectively reflected in the first domain reliability and the second domain reliability, but the disclosure is not limited thereto. A method, performed by the server 2000, of selecting a domain related to the text based on the first domain reliability and the second domain reliability will be described in more detail with reference to FIG. 7.

The server 2000 may input the text received from the device 1000 to the text modification model 63 of the first domain, and may obtain modified text output from the text modification model 63. Next, the server 2000 may provide the modified text to the device 1000.

Figure 7:
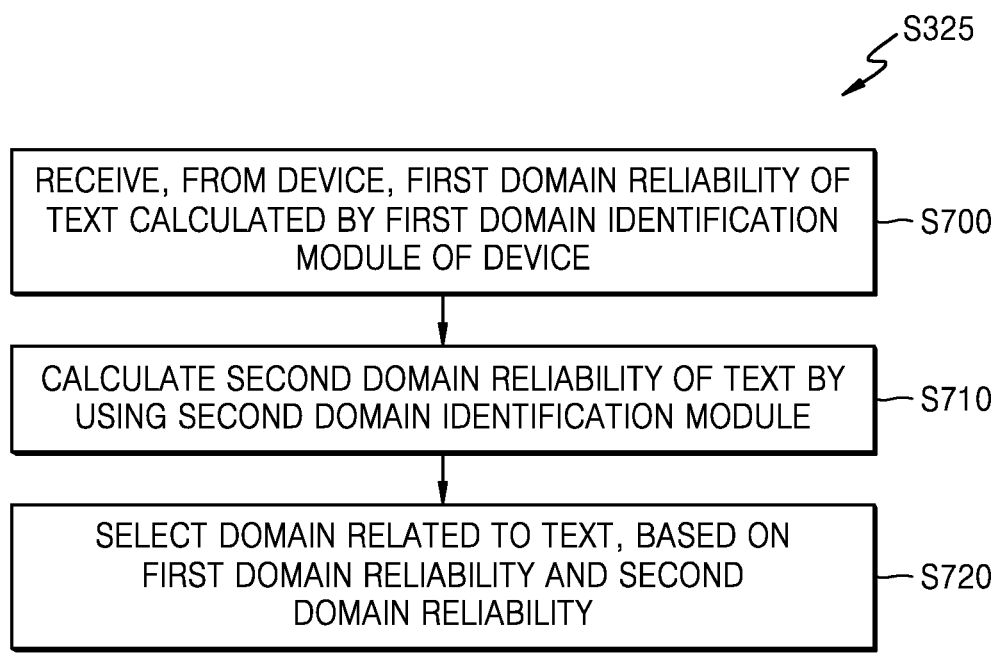
FIG. 7 is a flowchart illustrating a method, performed by a server, of selecting a domain related to text by using a domain reliability obtained by a device and a domain reliability obtained by the server, according to an embodiment of the disclosure.

FIG. 7 is a flowchart illustrating a method, performed by a server, of selecting a domain related to text by using a domain reliability obtained by a device and a domain reliability obtained by the server, according to an embodiment of the disclosure.

In operation S700, the server 2000 may receive, from the device 1000, a first domain reliability of text calculated by the first domain identification module 61 of the device 1000. The first domain identification module 61 of the device 1000 may calculate a confidence score indicating a degree to which the text output from the ASR model 60 is related to a pre-registered domain. In this case, for example, the domain identification module 61 that is an AI model trained for domain identification may output the first domain reliability by using the text as an input value. When a plurality of domains are registered in the device 1000, the first domain identification module 61 may obtain a first plurality of domain reliabilities each indicating a degree to which the text is related to each of the plurality of domains.

In operation S710, the server 2000 may calculate a second domain reliability of the text received from the device 1000 by using the second domain identification module 62. The second domain identification module 62 of the server 2000 may calculate a confidence score indicating a degree to which the text received from the device 1000 is related to a pre-registered domain. In this case, for example, the domain identification module 62 that is an AI model trained for domain identification may output the second domain reliability by using the text as an input value. When a plurality of domains are registered in the server 2000, the second domain identification module 62 may obtain a second plurality of domain reliabilities each indicating a degree to which the text is related to each of the plurality of domains.

In operation S720, the server 2000 may select a domain related to the text, based on the first domain reliability and the second domain reliability. The server 2000 may select the domain related to the text from among the plurality of domains that are pre-registered based on a weighted sum of the first domain reliability and the second domain reliability. For example, when a domain having a high first domain reliability and a domain having a high second domain reliability are different from each other, the server 2000 may assign a preset first weight value to the first domain reliability and may assign a preset second weight value to the second domain reliability. Also, the server 2000 may select the domain related to the text from among the plurality of pre-registered domains, based on the first domain reliability to which the first weight value is assigned and the second domain reliability to which the second weight value is assigned. In this case, for example, because the first domain reliability and the second domain reliability are normalized, weight values may be respectively reflected in the first domain reliability and the second domain reliability, but the disclosure is not limited thereto. For example, when the first domain reliability is a reliability of a domain of a higher layer and the second domain reliability is a reliability of a domain of a lower layer, a low weight value may be assigned to the first domain reliability and a high weight value may be assigned to the second domain.

According to an embodiment of the disclosure, the server 2000 may consider a reliability of the text output from the ASR model of the device, to select a domain. In this case, the reliability of the text output from the ASR model may be obtained by the device 1000 and may be provided to the server 2000, but the disclosure is not limited thereto. Also, for example, the server 2000 may assign a preset third weight value to the reliability of the text output from the device 1000, and may select a domain related to the text from among the plurality of pre-registered domains, based on the first domain reliability to which the first weight value is assigned, the second domain reliability to which the second weight value is assigned, and the reliability of the text to which the third weight value is assigned.

For example, when a domain having a high first domain reliability and a domain having a high second domain reliability are the same, the server 2000 may select the domain having the high first domain reliability, from among the plurality of domains, without considering weight values.

Figure 8:
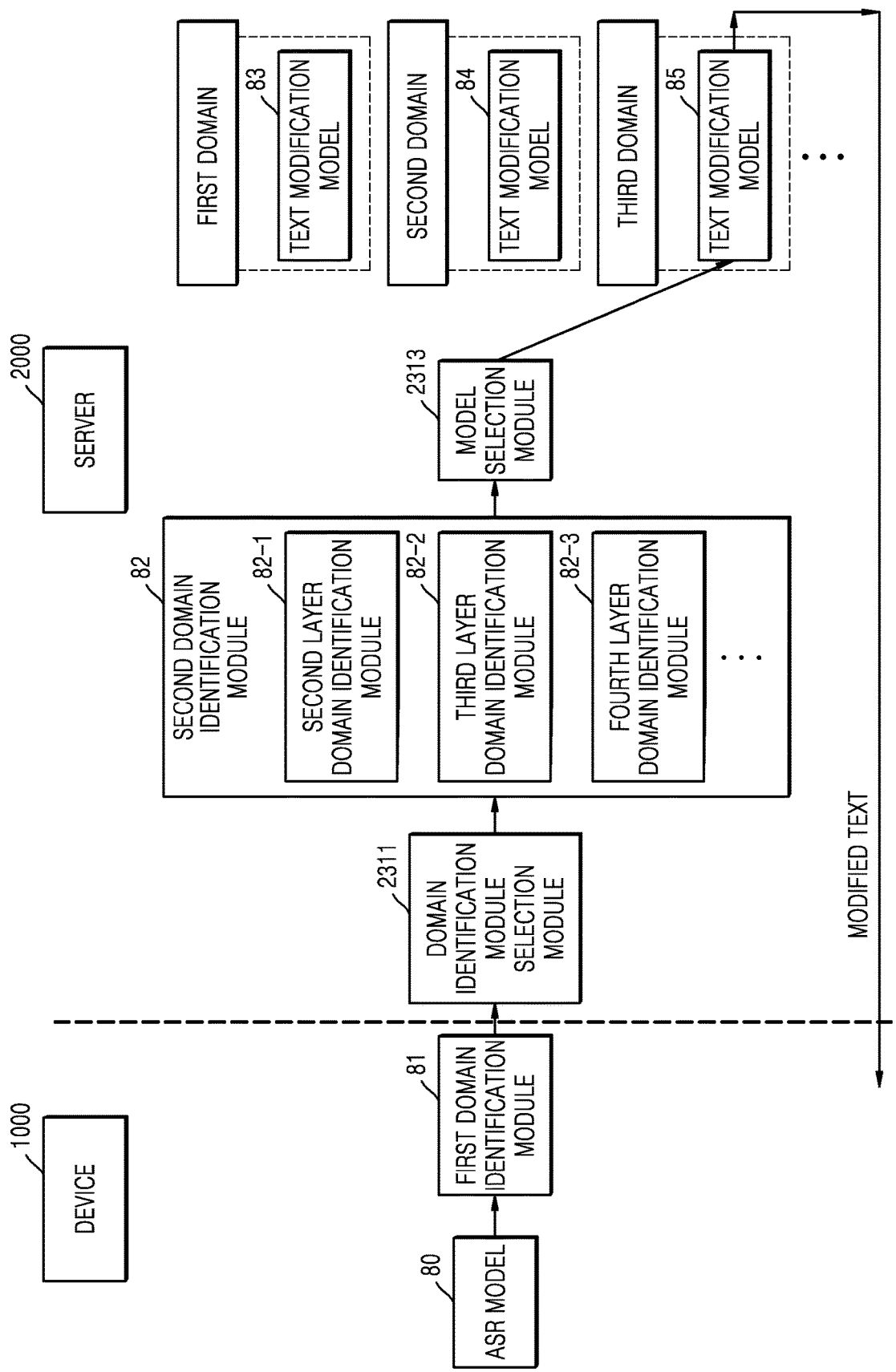
FIG. 8 is a diagram illustrating a server selecting a text modification model by using a domain identification module selected from among a plurality of domain identification modules in the server, according to an embodiment of the disclosure.

FIG. 8 is a diagram illustrating a server selecting a text modification model by using a domain identification module selected from among a plurality of domain identification modules in the server, according to an embodiment of the disclosure.

Referring to FIG. 8, text output from an ASR model 80 of the device 1000 may be provided to a first domain identification module 81 in the device 1000. The first domain identification module 81 may be the domain identification module 1440. The device 1000 may obtain a first domain reliability of the text output from the ASR model 80, by using the first domain identification module 81 in the device 1000. Also, the device 1000 may provide the text output from the ASR model 80 and the first domain reliability obtained from the first domain identification module 81 to the server 2000.

The server 2000 may select one of a plurality of second domain identification modules 82 in the server 2000, based on the first domain reliability received from the device 1000. Domains for speech recognition in a speech recognition system may be hierarchically set. The domains for speech recognition may include, for example, first layer domains, second layer domains that are sub-domains of the first layer domains, third layer domains that are sub-domains of the second layer domains, and fourth layer domains that are sub-domains of the third layer domains. Also, for example, the second domain identification modules 82 may include, for example, at least one second layer domain identification module 82-1, at least one third layer domain identification module 82-2, and at least one fourth layer domain identification module 82-3. Also, for example, a first layer domain may correspond to the first domain identification module 81, a second layer domain may correspond to the second layer domain identification module 82-1, a third layer domain may correspond to the third layer domain identification module 82-2, a fourth layer domain may correspond to the fourth layer domain identification module 82-3, and a fifth layer domain may correspond to a text modification model. In this case, the server 2000 may identify a second layer domain having a high reliability from among a plurality of second layer domains according to the first domain reliability calculated from the first domain identification module 81, by using a domain identification module selection module 2311. Also, the domain identification module selection module 2311 of the server 2000 may select the second layer domain identification module 82-1 corresponding to the identified second layer domain.

Also, for example, the server 2000 may obtain a second domain reliability of the text by using the selected second layer domain identification module 82-1. For example, the domain identification module selection module 2311 of the server 2000 may identify a third layer domain having a high reliability from among a plurality of third layer domains based on the second domain reliability, and may select the third layer domain identification module 82-2 corresponding to the identified third layer domain.

Also, for example, the server 2000 may obtain a third domain reliability of the text by using the selected third layer domain identification module 82-2. For example, the domain identification module selection module 2311 of the server 2000 may identify a fourth layer domain having a high reliability from among a plurality of fourth layer domains based on the third domain reliability, and may select the fourth layer domain identification module 82-3 corresponding to the identified fourth layer domain.

Also, for example, the server 2000 may obtain a fourth domain reliability of the text by using the selected fourth layer domain identification module 82-3. The model selection module 2313 of the server 2000 may select a text modification model 85 corresponding to a third domain from among a plurality of text modification models based on the fourth domain reliability.

Next, the server 2000 may input the text received from the device 1000 to the text modification model 85 of the third domain, and may obtain modified text output from the text modification model 85. The server 2000 may provide the modified text to the device 1000.

Although layers of the second domain identification modules 82 in the server 2000 include a second layer, a third layer, and a fourth layer, and the server 2000 sequentially selects the second layer domain identification module 82-1, the third layer domain identification module 82-2, and the fourth layer domain identification module 82-3 in FIG. 8, the disclosure is not limited thereto.

The server 2000 may select a domain for text modification, in consideration of the second domain reliability calculated from the second layer domain identification module 82-1, the third domain reliability calculated from the third layer domain identification module 82-2, and the fourth domain reliability calculated from the fourth layer domain identification module 82-3. In this case, the server 2000 may normalize the second domain reliability calculated from the second layer domain identification module 82-1, the third domain reliability calculated from the third layer domain identification module 82-2, and the fourth domain reliability calculated from the fourth layer domain identification module 82-3, and may select the domain for text modification by comparing the normalized values of the domain reliability scores.

For example, the first domain identification module 81 may calculate domain reliabilities of first layer domains, the second layer domain identification module 82-1 may calculate domain reliabilities of second layer domains, the third layer domain identification module 82-2 may calculate domain reliabilities of third layer domains, and the fourth layer domain identification module 82-3 may calculate domain reliabilities of fourth layer domains.

Layers of the second domain identification modules 82 in the server 2000 may include only a second layer. Alternatively, layers of the second domain identification modules 82 in the server 2000 may include other layers in addition to second through fourth layers. In this case, the server 2000 may include a domain identification module corresponding to each layer, according to the layers of the second domain identification modules 82 in the server 2000.

For example, the first domain identification module 81 may calculate a domain reliability of "location" that is a first layer domain as 60%, and may calculate a reliability of "weather" that is a first layer domain as 30%. The second layer domain identification module 82-1 may calculate a reliability of "Canada" that is a second layer domain as 40%, may calculate a reliability of "USA" that is a second layer domain as 20%, and may calculate a reliability of "Rain" that is a second layer domain as 25%. The third layer domain identification module 82-2 may calculate a reliability of "Brish Columbia" that is a third layer domain as 20%, may calculate a reliability of "Ontario" that is a third layer domain as 30%, may calculate a reliability of "New York" that is a third layer domain as 10%, and may calculate a reliability of "Precipitation" that is a third layer domain as 5%.

Also, for example, a domain selection module 2313 may assign a first weight value to the domain reliability of "location" that is the first layer domain and the reliability of "weather" that is the first layer domain. The domain selection module 2313 may assign a second weight value to the reliability of "Canada" that is the second layer domain, the reliability of "USA" that is the second layer domain, and the reliability of "Rain" that is the second layer domain. The domain selection module 2313 may assign a third weight value to the reliability of "Brish Columbia" that is the third layer domain, the reliability of "Ontario" that is the third layer domain, the reliability of "New York" that is the third layer domain, and the reliability of "Precipitation" that is the third layer domain. In this case, the second weight value may be greater than the first weight value and may be less than the third weight value. Also, the domain selection module 2313 may select the domain for text modification in consideration of reliabilities to which the first weight value is assigned, reliabilities to which the second weight value is assigned, and reliabilities to which the third weight value is assigned.

Also, for example, the domain selection module 2313 may calculate a first weighted sum of the reliability of "location," the reliability of "Canada," and the reliability of "Columbia." The domain selection module 2313 may calculate a second weighted sum of the reliability of "location," the reliability of "Canada," and the reliability of "Ontario." The domain selection module 2313 may calculate a third weighted sum of the reliability of "location," the reliability of "USA," and the reliability of "New York." Also, for example, the domain selection module 2313 may calculate a fourth weighted sum of the reliability of "Weather," the reliability of "Rain," and the reliability of "Precipitation."

For example, the domain selection module 2313 may determine that the first weighted sum is the highest by comparing calculated weighted sums, and may determine "Brish Columbia" as the domain for text modification.

Also, for example, the domain selection module 2313 may select a second layer domain, based on a domain reliability of first layer domains and a reliability of second layer domains. The domain selection module 2313 may select sub-domains related to the selected second layer domain, and may modify the text by using text modification models corresponding to the selected sub-domains.

Also, although the first domain identification module 81 in the device 1000 corresponds to a first layer and the second domain identification modules 82 in the server 2000 correspond to second through fourth layers in FIG. 8, the disclosure is not limited thereto. For example, the first domain identification module 81 in the device 1000 may correspond to a first layer, and the second domain identification modules 82 in the server 2000 may correspond to first through third layers.

Weight values of domain reliabilities may be assigned based on context information related to the device 1000. The context information may include at least one of, but is not limited to, ambient environment information of the device 1000, state information of the device 1000, state information of a user, device usage history information of the user, or schedule information of the user. The ambient environment information of the device 1000 that is environment information within a certain radius from the device 1000 may include, for example, but is not limited to, weather information, temperature information, humidity information, illuminance information, noise information, and sound information. The state information of the device 1000 may include, but is not limited to, information about a mode of the device 1000 (e.g., a sound mode, a vibration mode, a silent mode, a power saving mode, a cutoff mode, a multi-window mode, and an automatic rotation mode), position information of the device 1000, time information, activation information of a communication module (e.g., Wi-Fi ON, Bluetooth OFF, GPS ON, or NFC ON), network connection state information of the device 1000, and information about an application executed in the device 1000 (e.g., application identification information, an application type, an application usage time, or an application usage cycle). The state information of the user that is information about the user's movement and life pattern may include, but is not limited to, information about the user's walking state, exercising state, driving state, sleep state, and mood state. The device usage history information of the user that is information about events in which the user uses the device 1000 may include, but is not limited to, information about execution of applications, functions executed by the applications, phone conversations of the user, and text messages of the user.

For example, weight values of domain reliabilities may be determined based on context information about an application being executed on the device 1000. For example, when a voice input of the user is an input for the application being executed on the device 1000, a high weight value may be assigned to a domain reliability of a domain related to the application. Alternatively, the domain related to the application may be directly determined as the domain for text modification. For example, when a voice input saying "Acrovista" is input while a map application is being executed on the device 1000, a high weight value may be assigned to a map domain or the map domain may be directly determined as the domain for text modification.

For example, weight values of domain reliabilities may be determined based on a conversation history of the user through a voice assistant service provided by the device 1000. For example, when a voice input saying "Search for IU" is input to the device 1000 while the user is talking about music to the device 1000 through the voice assistant service, a high weight value may be assigned to a music domain or the music domain may be directly determined as the domain for text modification.

For example, weight values of domain reliabilities may be determined based on sensing information collected by the device 1000. A weight value may be assigned to a domain based on location information (e.g., GPS information) obtained by the device 1000. For example, when a location of the device 1000 is near a movie theater, a high weight value may be assigned to a movie domain. For example, when a voice input of the user is input to the device 1000 while a restaurant is being searched in the device 1000, a high weight value may be assigned to a domain related to a location where the device 1000 is positioned.

Weight values of domain reliabilities may be assigned based on trend information. For example, a high weight value may be assigned to a domain of main news or a domain of a real-time search word through a portal site.

Figure 9:
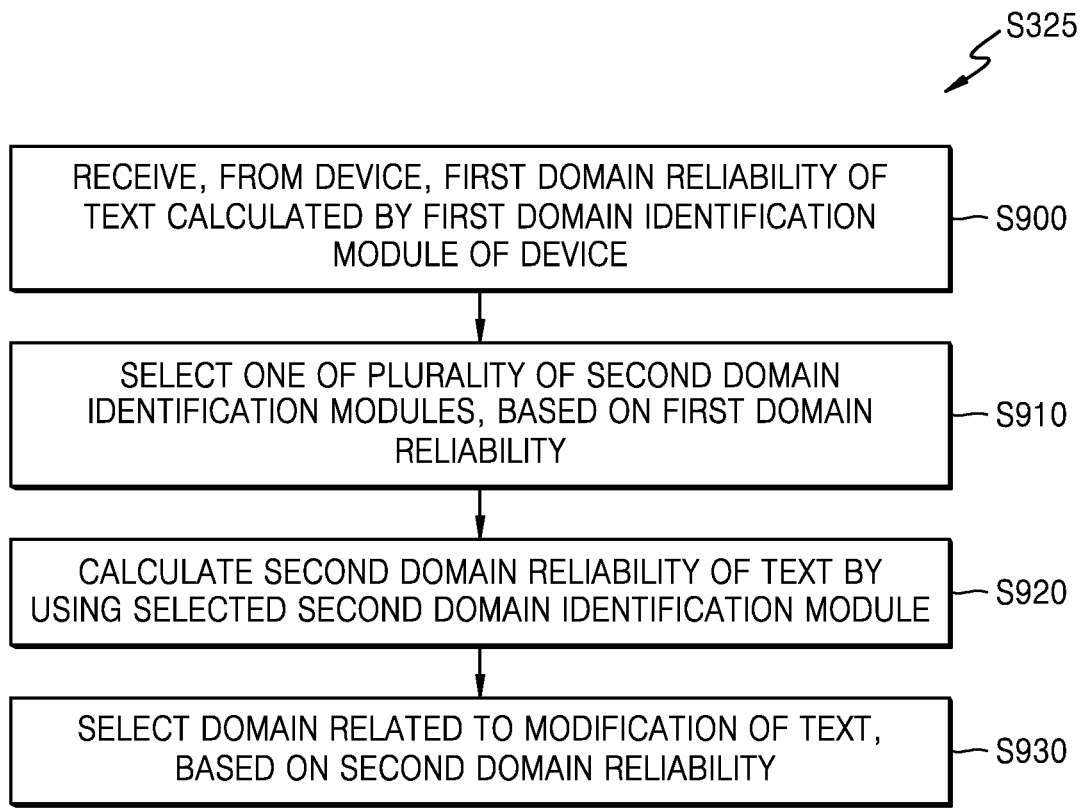
FIG. 9 is a flowchart illustrating a method of a server selecting a domain for text modification by using a domain identification module selected from among a plurality of domain identification modules, according to an embodiment of the disclosure.

FIG. 9 is a flowchart illustrating a method of a server selecting a domain for text modification by using a domain identification module selected from among a plurality of domain identification modules, according to an embodiment of the disclosure.

Figure 10:
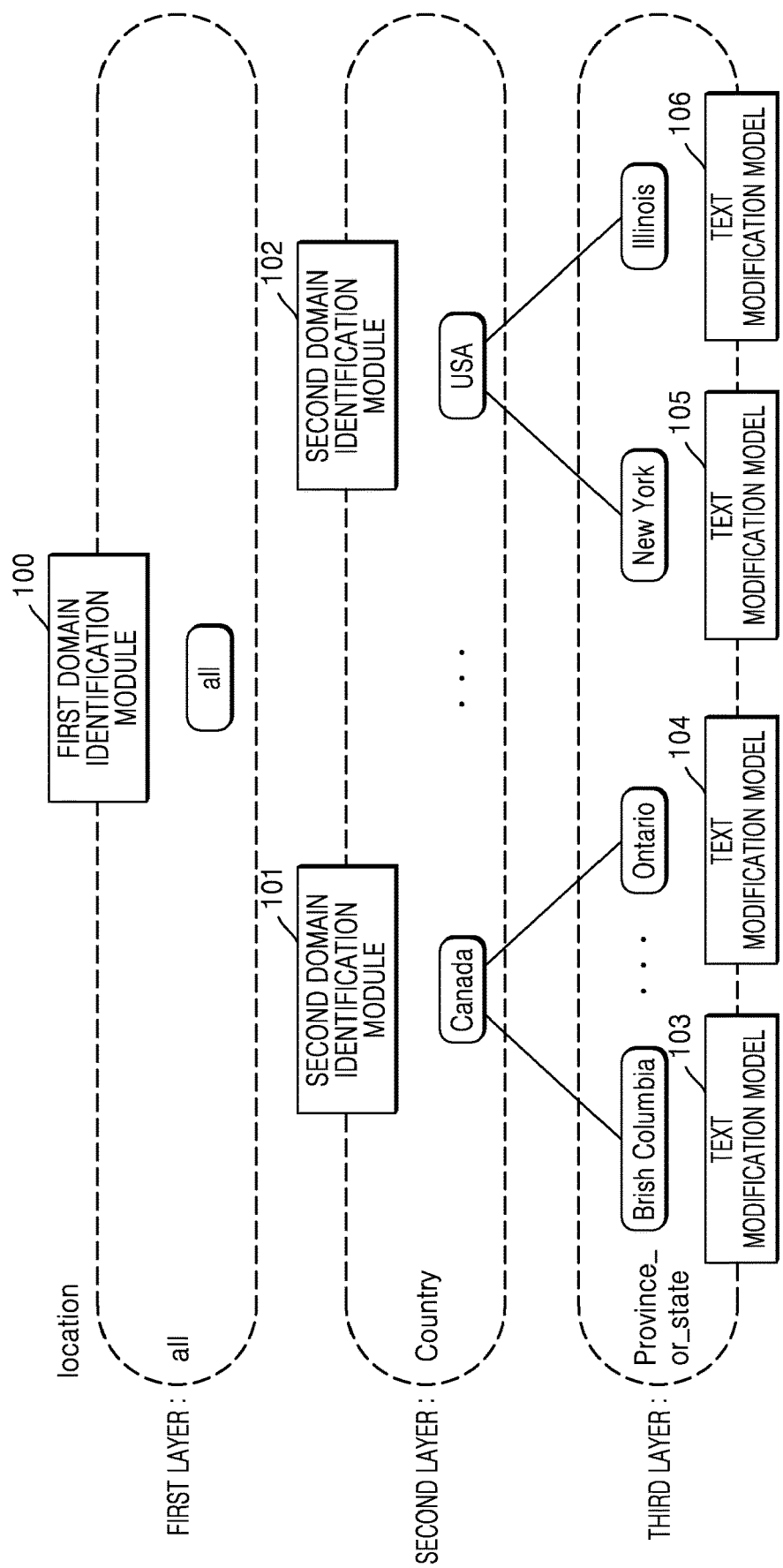
FIG. 10 is a diagram illustrating a first domain identification module, a second domain identification module, and a text modification model related to domains that are hierarchically classified, according to an embodiment of the disclosure.

FIG. 10 is a diagram illustrating a first domain identification module, a second domain identification module, and a text modification module related to domains that are hierarchically classified according to an embodiment of the disclosure.

In FIGS. 9 and 10, for example, domains for speech recognition may be classified into a first layer, a second layer, and a third layer.

In operation S900, the server 2000 may receive, from the device 1000, a first domain reliability of text calculated by the first domain identification module 81 of the device 1000. The server 2000 may receive, from the device 1000, the first domain reliability of the text output from an ASR model of the device 1000. Referring to FIG. 10, for example, a first domain identification module 100 of the device 1000 may correspond to "all" that is a first layer domain related to "location," and a first domain reliability calculated from the first domain identification module 100 may be a domain reliability of a second layer domain related to "country." For example, the first domain reliability may include a domain reliability of a domain "Canada" and a domain reliability of a domain "USA." Also, for example, a second domain identification module 101 may correspond to the domain "Canada," and the second domain identification module 102 may correspond to the domain "USA."

In operation S910, the server 2000 may select at least one of a plurality of second domain identification modules 82, based on the first domain reliability. The domain identification module selection module 2311 of the server 2000 may select the second layer domain identification module 82-1 from among the plurality of second domain identification modules 82 based on the first domain reliability. Referring to FIG. 10, for example, the server 2000 may compare the domain reliability of "Canada" and the domain reliability of domain "USA," and may determine that the domain reliability of "Canada" is higher than a certain threshold value. Also, the server 2000 may select the second domain identification module 101 corresponding to "Canada" from among the second domain identification module 101 corresponding to the domain "Canada" and the second domain identification module 102 corresponding to the domain "USA." In this case, the second domain identification module 101 and the second domain identification module 102 may be second domain identification modules corresponding to the second layer.

In operation S920, the server 2000 may calculate a second domain reliability of the text by using the selected second layer domain identification module 82-1. The second layer domain identification module 82-1 may calculate the second domain reliability by using the text as an input. Referring to FIG. 10, the second domain reliability calculated from the second domain identification module 101 may be a domain reliability of a third layer domain related to "province or state." For example, the second domain reliability may include a domain reliability of a domain "British Columbia," a domain reliability of a domain "Ontario," a domain reliability of a domain "New York," and a domain reliability of a domain "Illinois." Also, for example, a text modification model 103 may correspond to the domain "British Columbia," a text modification model 104 may correspond to the domain "Ontario," a text modification model 105 may correspond to the domain "New York," and a text modification model 106 may correspond to the domain "Illinois."

In operation S930, the server 2000 may select a domain related to text modification, based on the second domain reliability. The model selection module 2313 of the server 2000 may select one of a plurality of text modification models 83, 84, and 85 based on the second domain reliability. Referring to FIG. 10, for example, the server 2000 may compare the domain reliability of the domain "British Columbia," the domain reliability of the domain "Ontario," the domain reliability of the domain "New York," and the domain reliability of the domain "Illinois," and may determine that the domain reliability of the domain "British Columbia" is higher than a certain threshold value. Also, the server 2000 may select the domain "British Columbia" as a domain for text modification. Accordingly, the text may be modified by the text modification model 103 corresponding to the domain "British Columbia."

Although the first domain identification module 81 corresponds to the first layer, the second domain identification modules 82 correspond to the second layer, and the text modification models 83, 84, and 85 correspond to the third layer in FIGS. 9 and 10, the disclosure is not limited thereto. For example, the second domain identification modules 82 may correspond to more layers. For example, the first domain identification module 81 may correspond to the first layer, the second domain identification modules 82 may correspond to the second layer, the third layer, and a fourth layer, and the text modification models 83, 84, and 85 may correspond to a fifth layer, but the disclosure is not limited thereto.

In FIG. 10, the server 2000 may normalize a domain reliability calculated from the first domain identification module 100, a domain reliability calculated from the second domain identification module 101, and a domain reliability calculated from the second domain identification module 102, and may select a text modification model for text modification by comparing normalized values.

Figure 11:
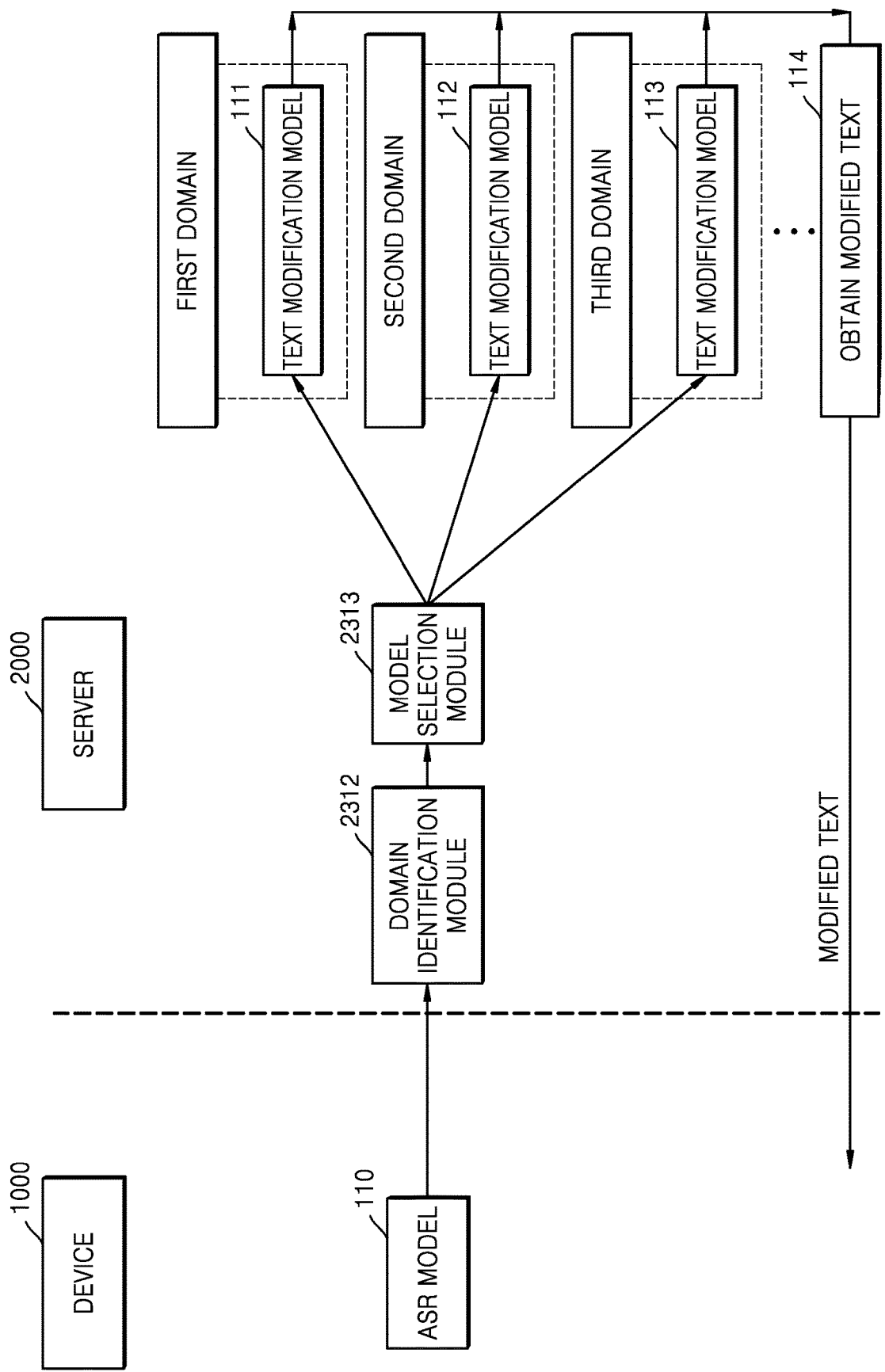
FIG. 11 is a diagram illustrating a server modifying text by using a plurality of text modification models, according to an embodiment of the disclosure.

FIG. 11 is a diagram illustrating a server modifying text by using a plurality of text modification models, according to an embodiment of the disclosure.

Referring to FIG. 11, text output from an ASR model 110 of the device 1000 may be provided to the domain identification module 2312 in the server 2000. The server 2000 may identify a domain related to the text received from the device 1000, by using the domain identification module 2312 in the server 2000. In this case, the server 2000 may identify the domain related to the text based on a domain reliability of the text received from the device 1000.

The domain identification module 2312 may obtain, for example, a domain reliability of a first domain, a domain reliability of a second domain, and a domain reliability of a third domain. For example, the domain identification module 2312 may divide the text into a plurality of sections, and may obtain the domain reliability of the first domain, the domain reliability of the second domain, and the domain reliability of the third domain for each section. For example, the domain identification module 2312 may classify the text into a first section, a second section, and a third section, and may obtain the domain reliability of the first domain, the domain reliability of the second domain, and the domain reliability of the third domain for each of the first section, the second section, and the third section. For example, when the server 2000 receives a text stream, the server 2000 may obtain first domain reliabilities of text of the first section, may obtain second domain reliabilities of text of the second section, and may obtain third domain reliabilities of text of the third section. In this case, while receiving a text stream, the server 2000 may modify text that is already received in real time, without waiting for text that is to be received later, and may identify a domain related to the text at a higher speed.

Alternatively, for example, when the server 2000 receives a text stream, the server 2000 may accumulate and calculate domain reliabilities of text of a plurality of sections. For example, while receiving a text stream, the server 2000 may divide text of one sentence into a plurality of sections, and may obtain domain reliabilities of text of a first section, may obtain domain reliabilities of text of first and second sections, and may obtain domain reliabilities of text of first through third sections. In this case, because the server 2000 calculates domain reliabilities in units of sentences by accumulating a plurality of sections, the server 2000 may more efficiently identify a domain related to text.

Alternatively, for example, for text of a sentence unit, the domain identification module 2312 may obtain a first domain reliability of a first domain, a second domain reliability of a second domain, and a third domain reliability of a third domain.

According to an embodiment of the disclosure, the model selection module 2313 of the server 2000 may select a text modification model for text modification. For example, when the text is divided into a plurality of sections, the server 2000 may select different text modification models according to the sections of the text. For example, when the text is divided into a first section, a second section, and a third section, the server 2000 may select a text modification model 111 to modify the first section of the text, may select a text modification model 112 to modify the second section of the text, and may select a text modification model 113 to modify the third section of the text.

Alternatively, for example, the server 2000 may select a plurality of text modification models to modify text of a sentence unit. For example, the server 2000 may select the text modification model 111, the text modification model 112, and the text modification model 113 to modify the text of the sentence unit.

Next, the server 2000 may obtain modified text for the text received from the device 1000, by using first modified text output from the text modification model 111, second modified text output from the text modification model 112, and third modified text output from the text modification model 113.

For example, the server 2000 may select at least one of the first modified text, the second modified text, or the third modified text, and may obtain the modified text for the text received from the device 1000 by using any portions of the selected modified text. Alternatively, for example, the server 2000 may obtain the modified text for the text received from the device 1000, by selecting one of the first modified text, the second modified text, and the third modified text. Alternatively, for example, the server 2000 may obtain the modified text for the text received from the device 1000, by combining at least part of the first modified text, at least part of the second modified text, and at least part of the third modified text.

Next, the server 2000 may provide the modified text to the device 1000.

Figure 12:
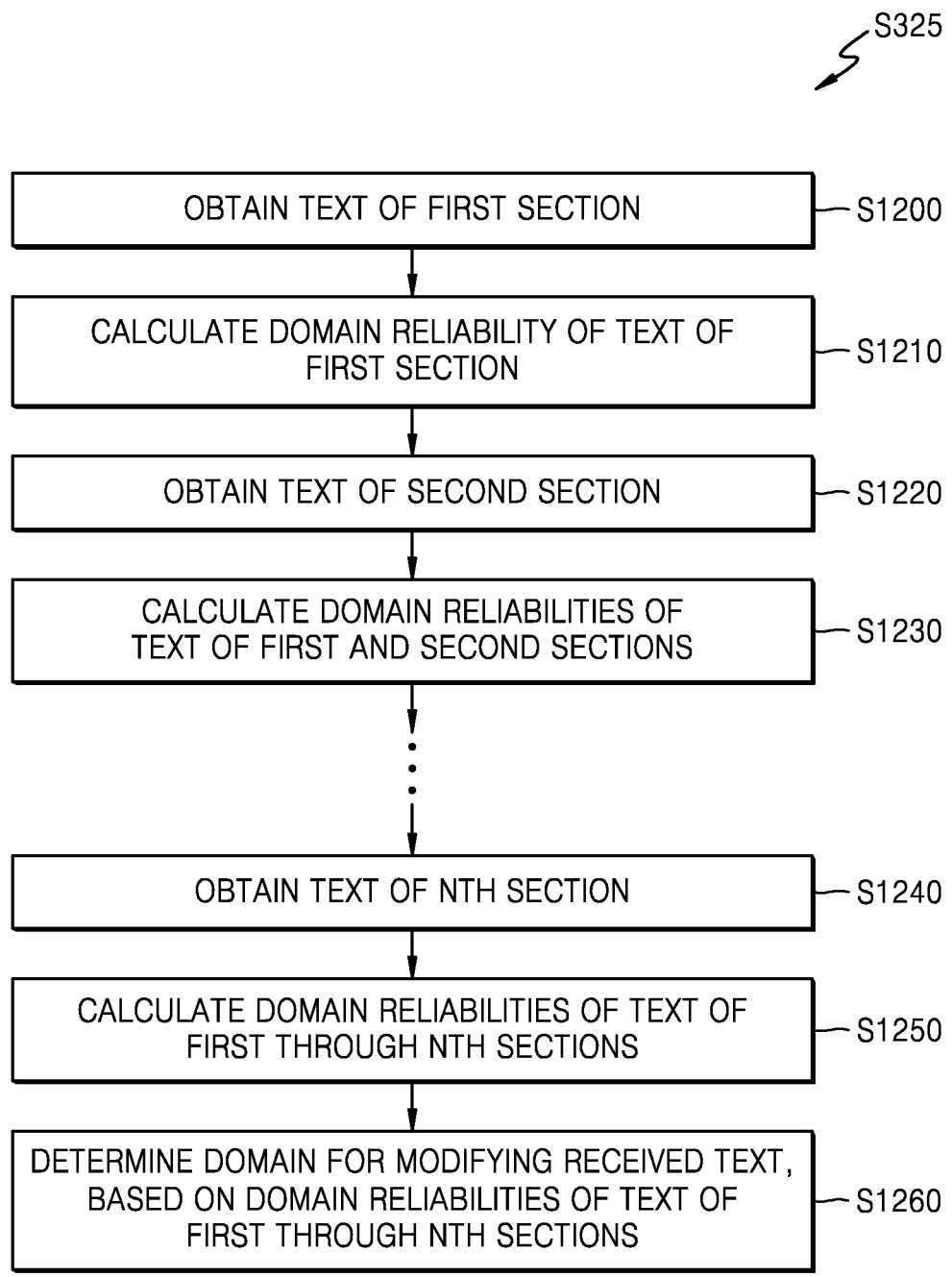
FIG. 12 is a flowchart illustrating a method of a server accumulating and calculating domain reliabilities of text of a plurality of sections, according to an embodiment of the disclosure.

FIG. 12 is a flowchart illustrating a method of a server accumulating and calculating domain reliabilities of text of a plurality of sections, according to an embodiment of the disclosure.

In operation S1200, the server 2000 may obtain a first section of text. The text may be divided into a plurality of sections, and the sections of the text may be divided, for example, in units of syntactic words, words, or phrases. The server 2000 may receive the text from the device 1000 as a text stream. In this case, the server 2000 may obtain the first section of the text while receiving the text stream in real time. Alternatively, the server 2000 may receive the text as a sentence from the device 1000, and may extract text of the first section from the received text.

In operation S1210, the server 2000 may calculate a domain reliability of the text of the first section. The server 2000 may calculate the domain reliability of the text of the first section, for domains registered in the server 2000.

In operation S1220, the server 2000 may obtain a second section of the text. When the server 2000 receives the text as a text stream from the device 1000, the server 2000 may obtain the second section of the text while receiving the text stream in real time. Alternatively, the server 2000 may receive the text as a sentence from the device 1000, and may extract text of the second section from the received text.

In operation S1230, the server 2000 may calculate domain reliabilities of the text of the first and second sections. The server 2000 may accumulate the text of the first section and the text of the second section, and may calculate domain reliabilities of the text of the first section and the text of the second section.

In operation S1240, the server 2000 may obtain an $n^{th}$ section of the text. When the server 2000 receives the text as a text stream from the device 1000, the server 2000 may obtain the $n^{th}$ section of the text while receiving the text stream in real time. Alternatively, the server 2000 may receive the text as a sentence from the device 1000, and may extract text of the $n^{th}$ section from the received text.

In operation S1250, the server 2000 may calculate domain reliabilities of text of first through $n^{th}$ sections. The server 2000 may accumulate the text of the first section through the text of the $n^{th}$ section, and may calculate domain reliabilities of the text of the first section through the text of the $n^{th}$ section.

In operation S1260, the server 2000 may determine a domain for modifying the text received from the device 1000, based on the domain reliabilities of the text of the first through $n^{th}$ sections.

Figure 13:
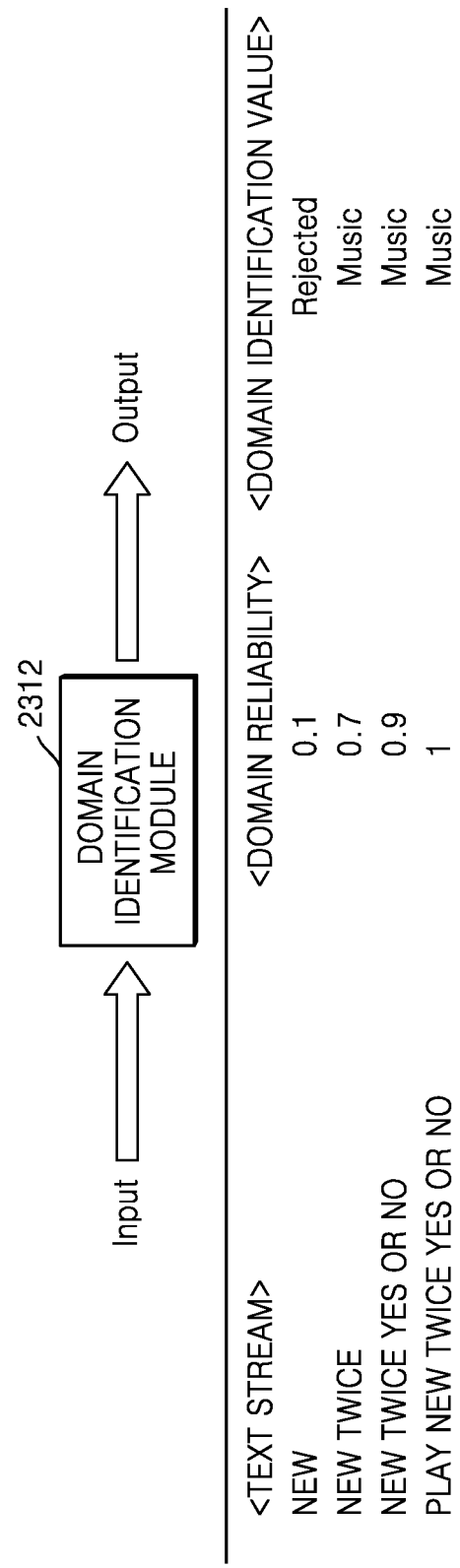
FIG. 13 is a diagram illustrating a server obtaining domain reliabilities of a text stream accumulated in units of syntactic words, according to an embodiment of the disclosure.

FIG. 13 is a diagram illustrating a server obtaining domain reliabilities of a text stream accumulated in units of syntactic words, according to an embodiment of the disclosure.

Referring to FIG. 13, the domain identification module 2312 of the server 2000 may divide text in units of syntactic words, may accumulate the divided text, and may obtain domain reliabilities of the accumulated text.

For example, when "new" that is text of a first section is input to the domain identification module 2312, the domain identification module 2312 may output "Rejected" as a domain identification value because a domain reliability related to "new" is "0.1" that is a low value.

Next, when "TWICE" that is text of a second section is input to the domain identification module 2312, the domain identification module 2312 may accumulate "new" that is the text of the first section and "TWICE" that is the text of the second section, and may output "Music" as a domain identification value related to "new TWICE" that is accumulated text and "0.7" as a domain reliability.

Next, when "Yes or No" that is text of a third section is input to the domain identification module 2312, the domain identification module 2312 may accumulate "new" that is the text of the first section, "TWICE" that is the text of the second section, and "Yes or No" that is the text of the third section, and may output "Music" as a domain identification value related to "new TWICE Yes or No" that is accumulated text and "0.9" as a domain reliability.

Next, when "Play" that is text of a fourth section is input to the domain identification module 2312, the domain identification module 2312 may accumulate "new" that is the text of the first section, "TWICE" that is the text of the second section, "Yes or No" that is the text of the third section, and "Play" that is the text of the fourth section, and may output "Music" as a domain identification value related to "Play new TWICE Yes or No" that is accumulated text and "1.0" as a domain reliability.

Accordingly, the server 2000 may select a domain modification model of a domain "Music," as a domain modification model for modifying "Play new TWICE Yes or No."

Although the domain identification module 2312 outputs a domain and a domain reliability having a highest value in FIG. 13, the disclosure is not limited thereto. The domain identification module 2312 may output a domain reliability of each of a plurality of domains registered in the server 2000.

Although domain reliabilities of text of a plurality of sections are accumulated and calculated in FIG. 13, the disclosure is not limited thereto. For example, the server 2000 may sequentially select text modification models for modifying text of a plurality of sections. For example, when the server 2000 receives a text stream, the server 2000 may select a text modification model for modifying text of a first section by calculating a domain reliability of the text of the first section, may select a text modification model for modifying text of a second section by calculating a domain reliability of the text of the second section, and may select a text modification model for modifying text of an $n^{th}$ section by calculating a domain reliability of the text of the $n^{th}$ section, while receiving the text stream.

Figure 14:
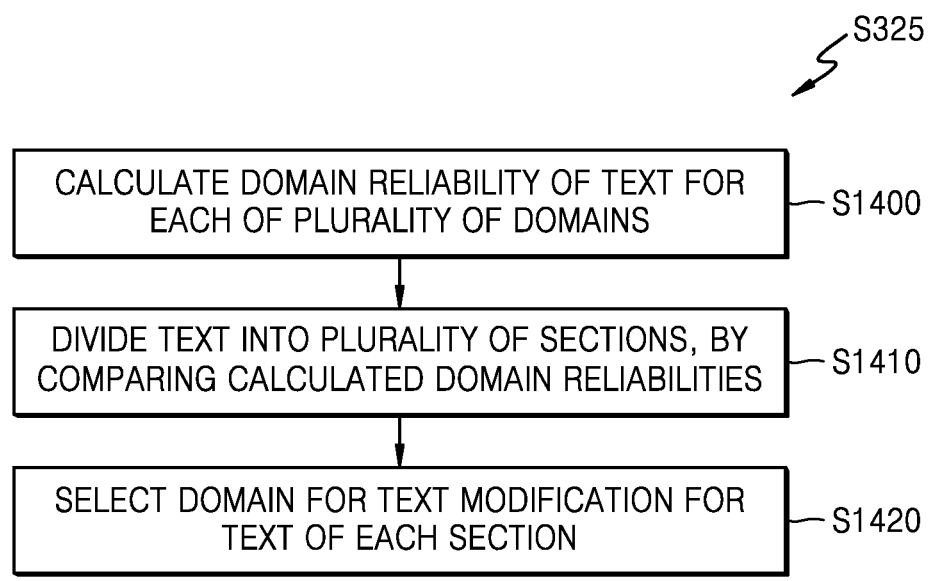
FIG. 14 is a flowchart illustrating a method of a server dividing text into a plurality of sections and selecting a domain of text of each of the plurality of sections, according to an embodiment of the disclosure.

FIG. 14 is a flowchart illustrating a method of a server dividing text into a plurality of sections and selecting a domain of text of each of the plurality of sections, according to an embodiment of the disclosure.

In operation S1400, the server 2000 may calculate a domain reliability of text for each of a plurality of domains. The server 2000 may calculate domain reliabilities of a plurality of domains registered in the server 2000 for the text received from the device 1000.

In operation S1410, the server 2000 may divide the text into a plurality of sections, by comparing the calculated domain reliabilities. The server 2000 may divide the text into the plurality of sections, by identifying a text section having a high domain reliability for each domain.

In operation S1420, the server 2000 may select a domain for text modification for text of each section. The server 2000 may select a domain having a highest domain reliability for text of each section, as a domain corresponding to the text of each section.

Figure 15:
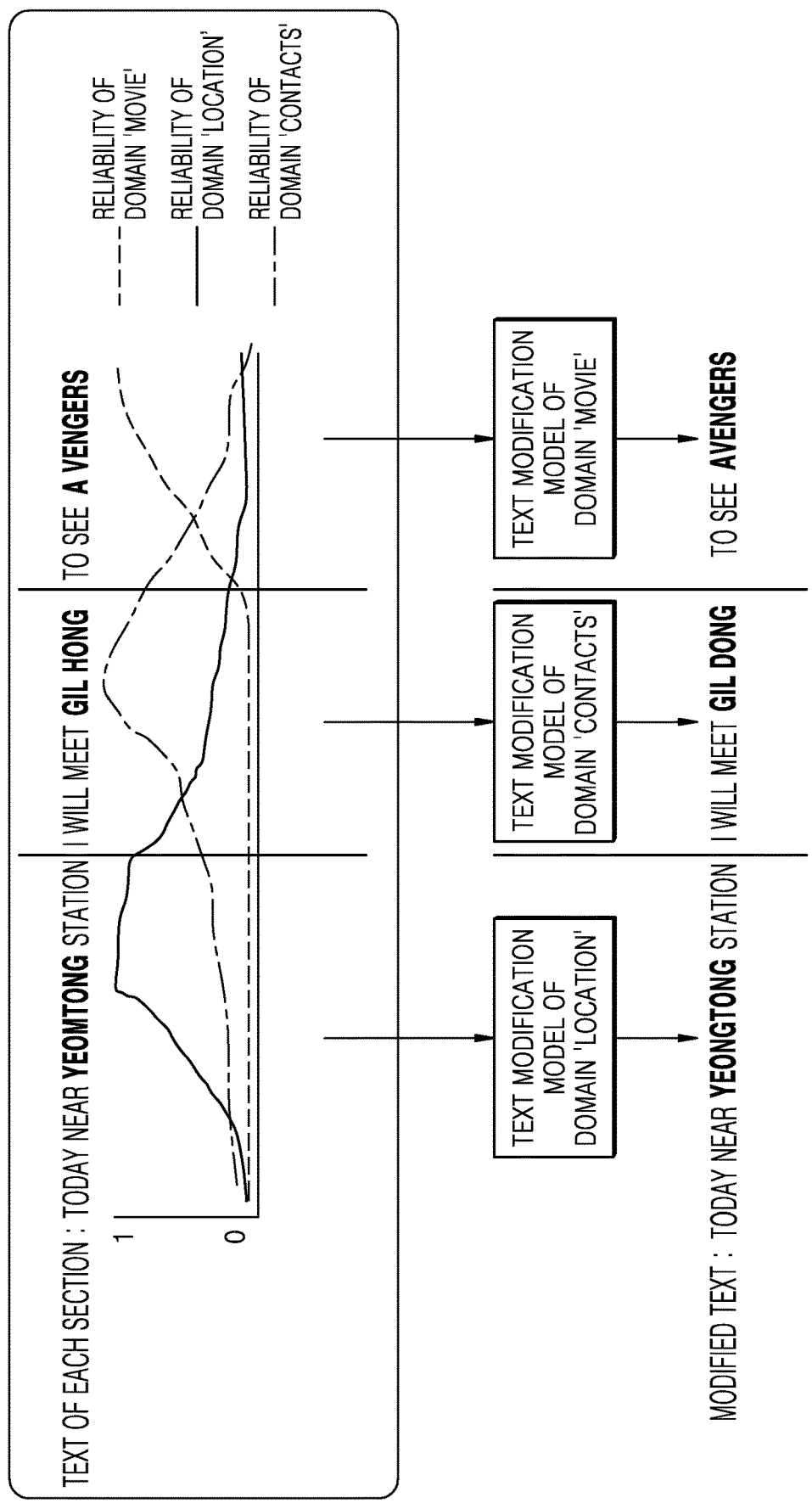
FIG. 15 is a diagram illustrating an example of a server comparing domain reliabilities of text according to a plurality of domains and selecting and modifying a text modification model of text of each section, according to an embodiment of the disclosure.

FIG. 15 is a diagram illustrating an example of a server comparing domain reliabilities of text according to a plurality of domains and selecting and modifying a text modification model of text of each section, according to an embodiment of the disclosure.

Referring to FIG. 15, the server 2000 may divide text into a plurality of sections while receiving a text stream, and may calculate a domain reliability of text of each section in real time. For example, the server 2000 may receive a text stream saying "I will meet Gil Hong today near Yeomtong Station to see the A vengers." The server 2000 may identify "today near Yeomtong Station" as a first section, may identify "I will meet Gil Hong" as a second section, and may identify "to see the A vengers" as a third section, while receiving the text stream. Also, while receiving the text stream, the server 2000 may sequentially calculate domain reliabilities related to "today near Yeomtong Station," domain reliabilities related to "I will meet Gil Hong," and domain reliabilities related to "to see the A vengers."

For example, for each section of the text saying "I will meet Gil Hong today near Yeomtong Station to see the A vengers," the domain identification module 2312 of the server 2000 may calculate a domain reliability of a domain "Movie," a domain reliability of a domain "location," and a domain reliability of a domain "contacts."

For example, the domain selection module 2313 of the server 2000 may compare the domain reliability of the domain "Movie," the domain reliability of the domain "location," and the domain reliability of the domain "contacts." The domain selection module 2313 may determine that the domain reliability of the domain "location" is high for "today near Yeomtong Station." The domain selection module 2313 may determine that the domain reliability of the domain "contacts" is high for "I will meet Gil Hong." The domain selection module 2313 may determine that the domain reliability of the domain "Movie" is high for "to see the A vengers." Accordingly, the domain selection module 2313 may sequentially identify "today near Yeomtong Station" as a first section, may identify "I will meet Gil Hong" as a second section, and may identify "to see the A vengers" as a third section, from the text stream saying "I will meet Gil Hong today near Yeomtong Station to see the A vengers."

Also, for example, the domain selection module 2313 may select a domain related to "today near Yeomtong Station" as the domain "location," may select a domain related to "I will meet Gil Hong" as the domain "contacts," and may select a domain related to "to see the A vengers" as the domain "Movie."

A text modification model of the domain "location" may modify "today near Yeomtong Station" to "today Yeongtong Station," a text modification model of the domain "contacts" may modify "I will meet Gil Hong" to "I will meet Gil Dong," and a text modification model of the domain "Movie" may modify "to see the A vengers" to "to see the Avengers." At least one of a text modification operation of the text modification model of the domain "location," a text modification operation of the text modification model of the domain "contacts," or a text modification operation of the text modification model of the domain "Movie" may be sequentially performed while the text stream is received.

FIG. 16 is a diagram illustrating a server modifying text received from a device by using modified text output from a plurality of text modification models, according to an embodiment of the disclosure.

Referring to FIG. 16, for example, the server 2000 may provide text 160 saying "I will meet Gil Hong today near Yeomtong Station to see the A vengers" to a text modification model of a domain "location," a text modification model of a domain "contacts," and a text modification model of a domain "Movie."

Accordingly, the text modification model of the domain "location" may output modified text 161 saying "I will meet Gil Hong today near Yeongtong Station to see the A vengers," the text modification model of the domain "movie" may output modified text 162 saying "I will meet Gil Hong today near Yeomtong Station to see the Avengers," and the text modification model of the domain "contacts" may output modified text 163 saying "I will meet Gil Dong today near Yeomtong Station to see the A vengers."

Next, the server 2000 may identify "Yeongtong" that is a modified word in the modified text 161, "the Avengers" that is a modified word in the modified text 162, and "Gil Dong" that is a modified word in the modified text 163, and may generate "I will meet Gil Dong today near Yeongtong Station to see the Avengers" that is modified text 164 to be provided to the device 1000.

Figure 17:
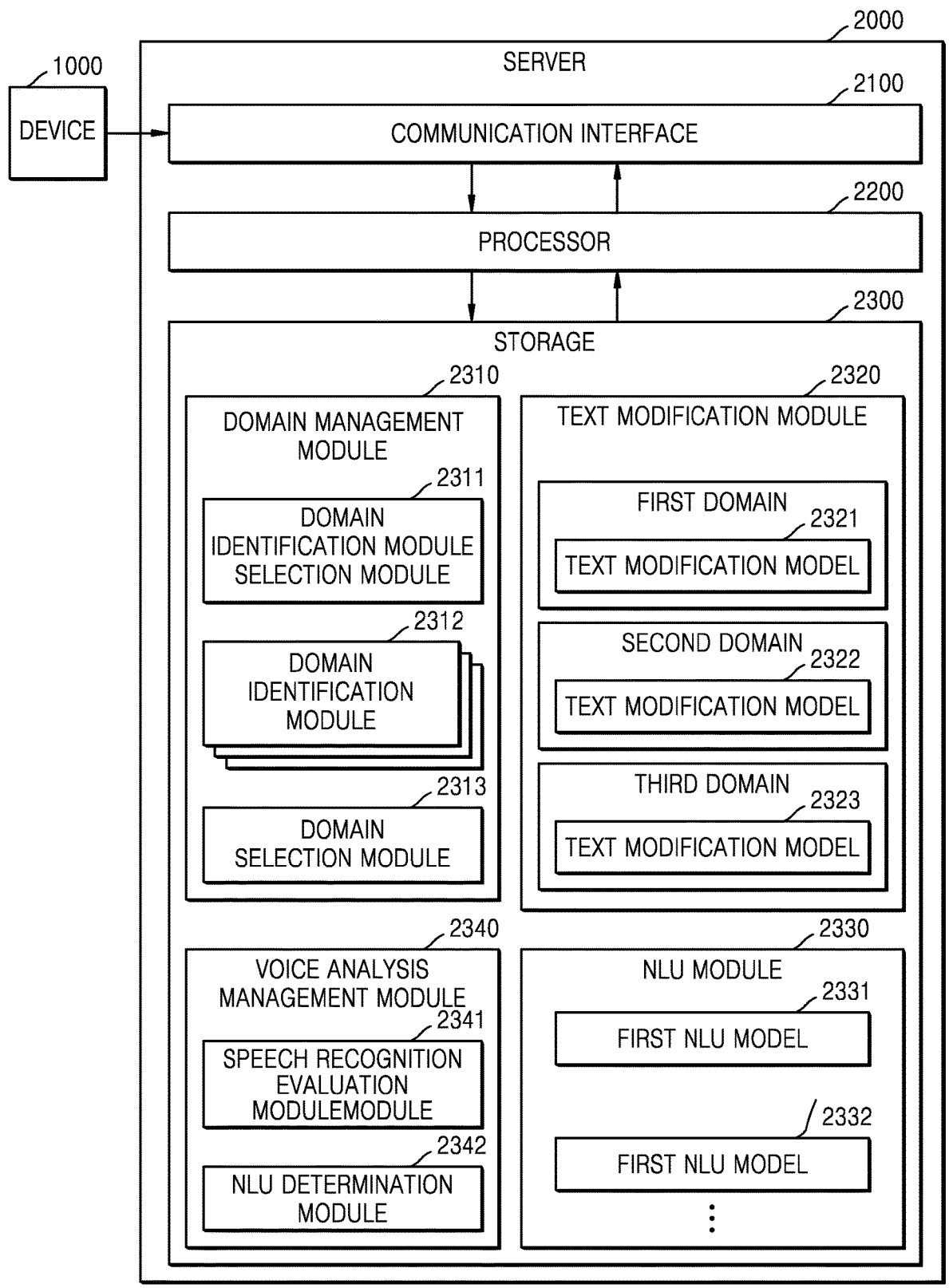
FIG. 17 is a block diagram illustrating a server according to an embodiment of the disclosure.

FIG. 17 is a block diagram illustrating a server according to an embodiment of the disclosure.

Referring to FIG. 17, the server 2000 according to an embodiment of the disclosure may include a communication interface 2100, a processor 2200, and a storage 2300, and the storage 2300 may include the domain management module 2310, the text modification module 2320, the NLU module 2330, and the voice analysis management module 2340.

The communication interface 2100 may include at least one element for communication with the device 1000 and another server. The communication interface 2100 may transmit/receive information for speech recognition and a voice assistant service to/from the device 1000 and another server. The communication interface 2100 may perform communication via, for example, but not limited to, a local area network (LAN), a wide area network (WAN), a value-added network (VAN), a mobile radio communication network, a satellite communication network, or a combination thereof.

The processor 2200 controls an overall operation of the server 2000. The processor 2200 may generally control operations of the server 2000 described herein, by executing programs stored in the storage 2300.

The storage 2300 may store a program used by the processor 2200 to perform processing and control, and may store data input to the server 2000 or output from the server 2000. The storage 2300 may include at least one type of storage medium of, but not limited to, a flash memory type, a hard disk type, a multimedia card micro type, a card type memory (e.g., a secure digital (SD) or extreme digital (XD) memory), a random-access memory (RAM), a static random-access memory (SRAM), a read-only memory (ROM), an electrically erasable programmable ROM (EEPROM), a programmable ROM (PROM), a magnetic memory, a magnetic disk, or an optical disk.

The programs stored in the storage 2300 may be classified into a plurality of modules according to their functions, for example, the domain management module 2310, the text modification module 2320, the NLU module 2330, and the voice analysis management module 2340.

The domain management module 2310 provides text received from the device 1000 to the text modification module 2320. The domain management module 2310 may include the domain identification module selection module 2311, at least one domain identification module 2312, and the domain selection module 2313.

The domain identification module selection module 2311 may select the domain identification module 2312. When there are a plurality of domain identification modules 2312, the domain identification module selection module 2311 may select at least some of the plurality of domain identification modules 2312.

The domain identification module selection module 2311 may select one of the plurality of domain identification modules 2312 in the server 2000, based on a first domain reliability received from the device 1000. Domains for speech recognition in a speech recognition system may be hierarchically set. The domains for speech recognition may include, for example, first layer domains, second layer domains that are sub-domains of the first layer domains, and third layer domains that are sub-domains of the second layer domains. Also, for example, a first layer domain may correspond to the domain identification module 1440 of the device 1000, a second layer domain may correspond to the domain identification module 2312 of the server 2000, and a third layer domain may correspond to the text modification module 2320. In this case, the domain identification module selection module 2311 may identify a second layer domain having a high reliability from among a plurality of second layer domains according to the first domain reliability calculated from the domain identification module 1440 of the device 1000. Also, the domain identification module selection module 2311 may select the domain identification module 2312 corresponding to the identified second layer domain.

The domain identification module 2312 may identify a domain for text modification. When the server 2000 receives domain information from the device 1000, the domain identification module 2312 may identify the domain for text modification from the domain information. Alternatively, when the server 2000 does not receive the domain information from the device 1000, the domain identification module 2312 may identify a domain related to the text, based on a domain reliability of the text received from the device 1000. For example, the domain identification module 2312 may calculate a confidence score indicating a degree to which the text received from the device 1000 is related to a domain that is pre-registered for text modification. Also, the domain identification module 2312 may identify the domain related to the text received from the device, based on a domain reliability calculated for the domain that is pre-registered. The domain identification module 2312 may identify the domain related to the text based on rules or may obtain the domain reliability related to the text by using an AI model trained for domain identification. Also, for example, the AI model for domain identification may be a part of an NLU model or a model separate from the NLU model.

The domain identification module 2312 may identify the domain related to the text, by accumulating text of a plurality of sections and calculating domain reliabilities of the accumulated text. Alternatively, the domain identification module 2312 may divide the text into a plurality of sections and may identify a domain related to text of each section.

The domain selection module 2313 may select a text modification model corresponding to the domain identified by the domain identification module 2312, from among a plurality of text modification models 2321, 2322, and 2323.

The domain selection module 2313 may select a domain corresponding to the domain identified by the domain identification module 2312 from among domains registered in the server 2000, and may select a text modification model of the selected domain.

When the domain identification module 2312 divides the text into a plurality of sections and identifies a domain related to text of each section, the domain selection module 2313 may select a domain for text of each section.

The text modification module 2320 modifies the text received from the device 1000. The text modification module 2320 may modify the text by using a text modification model corresponding to the determined domain. The text modification module 2320 may include the text modification model 2321 of a first domain, the text modification model 2322 of a second domain, and the text modification model 2323 of a third domain.

The text modification module 2320 may generate modified text by using the selected text modification model. The text modification module 2320 may input the text to the selected text modification model, and may obtain the modified text output from the text modification model. In this case, the text modification module 2320 may preprocess a format of the text received from the device 1000 to be suitable for processing the text modification model, and may input a preprocessed value to the text modification model.

When the text received from the device 1000 is related to a plurality of domains, the text modification module 2320 may select a plurality of text modification models corresponding to the plurality of domains for text modification. In this case, the text modification module 2320 may obtain the modified text to be provided to the device 1000, from pieces of modified text output from the plurality of text modification models. For example, when the text modification module 2320 generates a plurality of pieces of modified text by using the plurality of text modification models, the text modification module 2320 may compare reliabilities of the plurality of pieces of modified text and may determine modified text having a high or highest reliability as the modified text to be provided to the device 1000. A reliability of the modified text may be a value indicating a degree to which the modified text matches an input voice, and may include, for example, but is not limited to, a confidence score.

Also, for example, when the text modification module 2320 generates a plurality of pieces of modified text by using the plurality of text modification models, the text modification module 2320 may extract modified parts from the plurality of pieces of modified text and may obtain the modified text to be provided to the device 1000 by using the extracted modified parts.

Also, for example, the text modification module 2320 may obtain the modified text to be provided to the device 1000, by extracting some pieces of text from pieces of modified text output from the plurality of text modification models and combining the extracted some pieces of text. For example, when the text modification module 2320 generates first modified text and second modified text by using the plurality of text modification models and a reliability of part of the first modified text and a reliability of part of the second modified text are high, the text modification module 2320 may obtain the modified text to be provided to the device 1000 by combining the part of the first modified text and the part of the second modified text to generate modified text having a reliability higher than the first modified text and the second modified text.

Also, for example, when a domain related to text of each section is selected, the text modification module 2320 may provide the text of each section to a corresponding domain modification model. In this case, the text modification module 2320 may obtain the modified text to be provided to the device 1000 by combining pieces of modified text of sections output from respective domain modification models.

The NLU module 2330 may interpret the modified text output from the text modification module 2320. The NLU module 2330 may include a plurality of NLU models of a plurality of domains, such as a first NLU model 2331 and a second NLU model 2332. A result value generated when the NLU module 2330 interprets the text may include, for example, intent and parameters. The intent that is information determined by interpreting the text by using an NLU model may indicate, for example, a user's utterance intention. The intent may include information indicating the user's utterance intention (hereinafter, referred to as intention information) and also a numerical value corresponding to the information indicating the user's intention. The numerical value may indicate a probability that the text is related to information indicating a specific intention. When a plurality of pieces of intention information indicating the user's intention are obtained as a result obtained by interpreting the text by using the NLU model, intention information having a largest numerical value from among the plurality of intention information may be determined as the intent. Also, the parameters may indicate detailed information related to the intent. The parameters may be information related to the intent, and a plurality of types of parameters may correspond to one intent.

Also, a result value generated when the NLU module 2330 interprets the text may be used to provide a certain voice assistant service to the device 1000.

The voice analysis management module 2340 may evaluate the text modified by the text modification module 2320, and may determine whether to perform NLU processing on the modified text. The voice analysis management module 2340 may include a speech recognition evaluation module 2341 and an NLU determination module 2342.

The speech recognition evaluation module 2341 may calculate a reliability of the text modified by the text modification module 2320. The reliability of the modified text may be a value indicating a probability that the modified text matches an input voice, and may include, for example, but is not limited to, a confidence score. Also, the speech recognition evaluation module 2341 may calculate a domain reliability of the modified text. The speech recognition evaluation module 2341 may calculate the domain reliability indicating a degree to which the modified text is related to a domain that is pre-registered in the server 2000 for NLU processing.

The NLU determination module 2342 may determine whether to perform NLU processing on the modified text in the server 2000. The NLU determination module 2342 may determine whether to perform NLU processing in the server 2000, based on the reliability of the modified text and the domain reliability of the modified text. The NLU determination module 2342 may determine whether a domain related to the modified text is a domain for performing NLU processing in the device 1000 or a domain for performing NLU processing in the server 2000.

Figure 18:
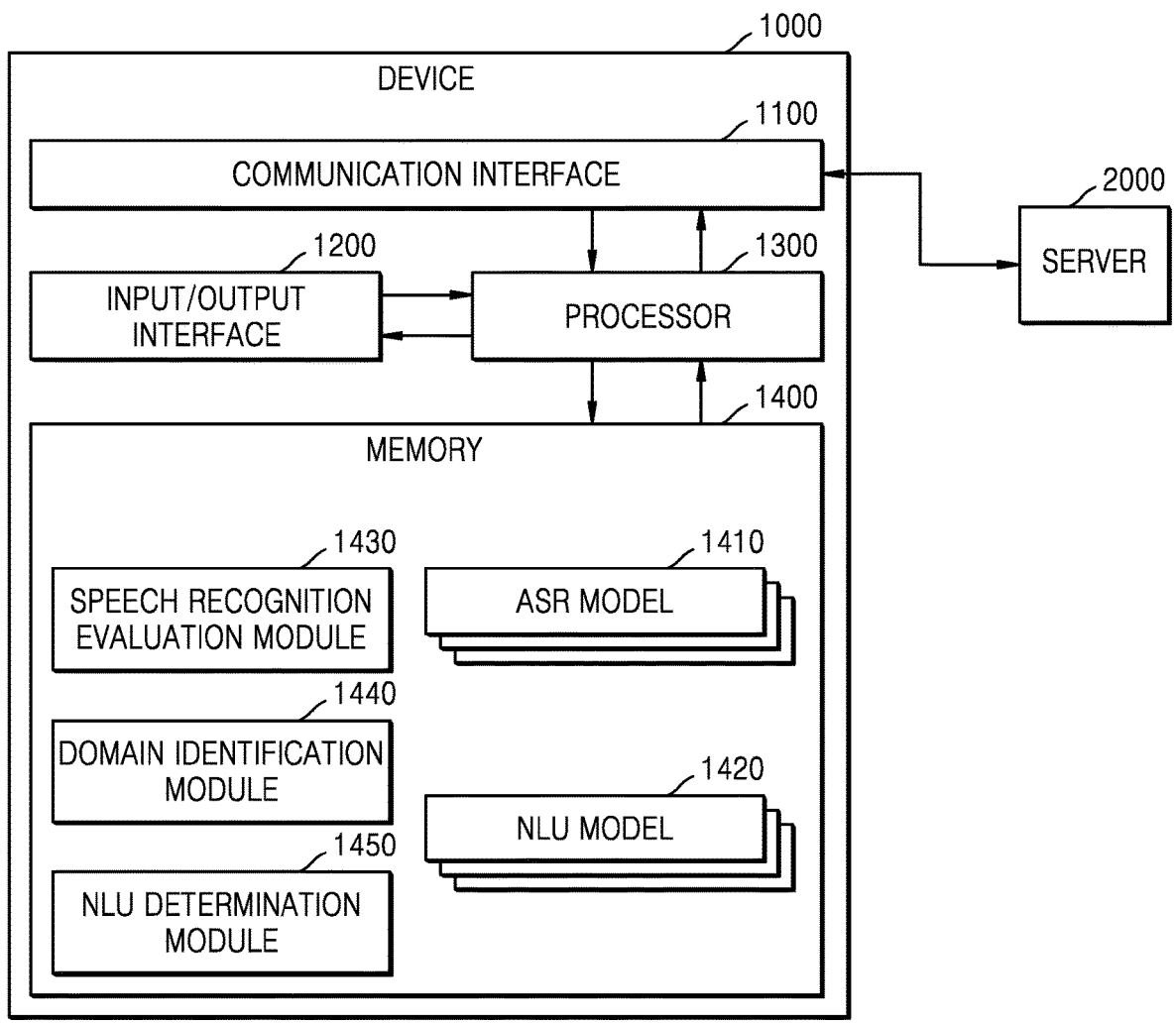
FIG. 18 is a block diagram illustrating a device according to an embodiment of the disclosure.

FIG. 18 is a block diagram illustrating a device according to an embodiment of the disclosure.

Referring to FIG. 18, the device 1000 according to an embodiment of the disclosure may include a communication interface 1100, an input/output interface 1200, a processor 1300, and a memory 1400, and the memory 1400 may include at least one ASR model 1410, at least one NLU model 1420, the speech recognition evaluation module 1430, the domain identification module 1440, and the NLU determination module 1450.

The communication interface 1100 may include at least one component for communication with the server 2000 and an external device. The communication interface 1100 may transmit/receive information for speech recognition and a voice assistant service to/from the server 2000 and the external device. The communication interface 1100 may perform communication via, for example, but not limited to, a local area network (LAN), a wide area network (WAN), a value-added network (VAN), a mobile radio communication network, a satellite communication network, or a combination thereof.

The input/output interface 1200 may receive data input to the device 1000, and may output data from the device 1000. The input/output interface 1200 may include a user input interface, a camera, a microphone, a display, and an audio output interface. The user input interface may include, but is not limited to, a key pad, a dome switch, a touchpad (e.g., a capacitive overlay type, a resistive overlay type, an infrared beam type, an integral strain gauge type, a surface acoustic wave type, a piezoelectric type, or the like), a jog wheel, or a jog switch.

The display may display and output information processed by the device 1000. For example, the display may display a graphical user interface (GUI) for a voice assistant service. When the display forms a layer structure together with a touchpad to construct a touchscreen, the display may be implemented as an input device as well as an output device. The display may include at least one of a liquid crystal display (LCD), a thin film transistor-liquid crystal display (TFT-LCD), an organic light-emitting diode (OLED), a flexible display, a three-dimensional (3D) display, or an electrophoretic display.

The audio output interface may output audio data and may include, for example, a speaker and a buzzer.

The camera may obtain an image frame—such as a still image or a moving picture, by using an image sensor in a video call mode or a photographing mode. An image captured by the image sensor may be processed by the processor 1300 or a separate image processor.

The microphone may receive a user's utterance and may process the user's utterance into electrical voice data.

The processor 1300 controls an overall operation of the device 1000. The processor 1300 may control the overall operation of the device 1000 described herein, by executing programs stored in the memory 1400.

The memory 1400 may store a program used by the processor 1300 to perform processing and control, and may store data input to or output from the device 1000. The memory 1400 may include at least one type of storage medium of, but not limited to, a flash memory type, a hard disk type, a multimedia card micro type, a card type memory (e.g., an SD or XD memory), a random-access memory (RAM), a static random-access memory (SRAM), a read-only memory (ROM), an electrically erasable programmable ROM (EEPROM), a programmable ROM (PROM), a magnetic memory, a magnetic disk, or an optical disk.

The programs stored in the memory 1400 may be classified into a plurality of modules according to their functions, for example, the ASR model 1410, the NLU model 1420, the speech recognition evaluation module 1430, the domain identification module 1440, and the NLU determination module 1450.

The ASR model 1410 may obtain text from a feature vector generated from a voice input of a user. The processor 1300 of the device 1000 may input the feature vector to the ASR model 1410 to recognize the user's voice. When a plurality of ASR models 1410 are included in the device 1000, the processor 1300 of the device 1000 may select one of the plurality of ASR models 1410 and may convert the feature vector into a format suitable for the selected ASR model 1410. The ASR model 1410 may be an AI model including, for example, an acoustic model, a pronunciation dictionary, and a language model. Alternatively, the ASR model 1410 may be an end-to-end speech recognition model having a structure including an integrated neural network without separately including, for example, an acoustic model, a pronunciation dictionary, and a language model.

The NLU model 1420 may interpret the text output from the ASR model 1410. Alternatively, the NLU model 1420 may interpret modified text provided from the server 2000. A result value generated when the NLU model 1420 interprets the text or the modified text may be used to provide a certain voice assistant service to the user.

The speech recognition evaluation module 1430 may obtain a reliability of the text output from the ASR model 1410. The reliability of the text may be a value indicting a degree to which the text output from the ASR model 1410 is related to an input voice, and may include, for example, but not limited to, a confidence score. Also, the reliability of the text may be related to a probability that the text will match the input voice. For example, the reliability of the text may be calculated based on at least one of likelihoods of a plurality of pieces of estimated text output from the ASR model 1410 of the device 1000 or posterior probabilities that at least one character in the text will be replaced by another character. For example, the speech recognition evaluation module 1430 may calculate the reliability based on a likelihood output as a result of Viterbi decoding. Alternatively, for example, the speech recognition evaluation module 1430 may calculate the reliability based on posterior probabilities output from a softmax layer in the end-to-end ASR model. Alternatively, for example, the speech recognition evaluation module 1430 may determine a plurality of pieces of estimated text estimated in a speech recognition process of the ASR model 1410 of the device 1000, and may calculate the reliability of the text based on a correlation of characters in the plurality of pieces of estimated text.

Also, the speech recognition evaluation module 1430 may determine whether to transmit the text output from the ASR model 1410 to the server 2000. The speech recognition evaluation module 1430 may determine whether to transmit the text to the server 2000, by comparing the reliability of the text with a preset threshold value. When the reliability of the text is equal to or greater than the preset threshold value, the speech recognition evaluation module 1430 may determine not to transmit the text to the server 2000. Also, when the reliability of the text is less than the preset threshold value, the speech recognition evaluation module 1430 may determine to transmit the text to the server 2000.

Also, the speech recognition evaluation module 1430 may determine whether to transmit the text to the server 2000, based on at least one text having a high reliability from among the plurality of pieces of estimated text estimated in the speech recognition process of the ASR model 1410. For example, when the plurality of pieces of estimated text estimated in the speech recognition process of the ASR model 1410 include first estimated text having a high reliability and second estimated text having a high reliability, and a difference between the reliability of the first estimated text and the reliability of the second estimated text is equal to or less than a certain threshold value, the speech recognition evaluation module 1430 may determine to transmit the text to the server 2000.

The domain identification module 1440 may identify a domain related to the text output from the ASR model 1410. The domain identification module 1440 may identify the domain related to the text, based on a domain reliability of the text output from the ASR model 1410. For example, the domain identification module 1440 may calculate a confidence score indicating a degree to which the text output from the ASR model 1410 is related to a pre-registered domain. The domain identification module 1440 that is an AI model trained for domain identification may output the domain reliability by using the text as an input value. Also, for example, the domain identification module 1440 may be a part of an NLU model, or a model separate from the NLU model. Alternatively, the domain identification module 1440 may identify the domain related to the text based on rules.

Domains for speech recognition in a speech recognition system may be hierarchically set, and the domain identified by the domain identification module 1440 of the device 1000 may be a domain of a higher layer than a domain identified by the domain identification module 2312 of the server 2000.

The NLU determination module 1450 may determine whether to perform NLU processing on the text output from the ASR model 1410 in the device 1000 or in the server 2000. The NLU determination module 1450 may determine whether the domain related to the text output from the ASR model 1410 is a domain for performing NLU processing in the device 1000. When the domain related to the text output from the ASR model 1410 is a domain pre-registered in the device 1000, the NLU determination module 1450 may determine that the device 1000 will perform NLU processing. Also, when the domain related to the text output from the ASR model 1410 is not a domain pre-registered in the device 1000, the NLU determination module 1450 may determine that the device 1000 will not perform NLU processing.

An AI-related function according to the disclosure is performed through a processor and a memory. The processor may include at least one processor. In this case, the at least one processor may include a general-purpose processor, such as a central processing unit (CPU), an access point (AP), or a digital signal processor (DSP), a graphics processor, such as a graphics processing unit (GPU) or a vision processing unit (VPU), or an AI processor, such as a neural processing unit (NPU). The at least one processor controls input data to be processed according to a pre-defined operation rule or AI model stored in the memory. Alternatively, when the at least one processor is an AI processor, the AI processor may be designed to have a hardware structure specialized to process a specific AI model.

The pre-defined operation rule or AI model is created through learning and training. When the pre-defined operation rule or AI model is created through learning, it means that the pre-defined operation rule or AI model set to achieve desired characteristics (or purposes) is created when a basic AI model is trained by using a plurality of training data by using a learning algorithm. The learning may be performed by a device itself in which AI according to the disclosure is used or may be performed through a separate server and/or system. Examples of the learning algorithm include, but are not limited to, supervised learning, unsupervised learning, semi-supervised learning, and reinforcement learning.

The AI model may include a plurality of neural network layers. The plurality of neural network layers may respectively have a plurality of weight values, and each perform a neural network operation through computation on the plurality of weight values and a computation result of a previous layer. The plurality of weight values of the plurality of neural network layers may be optimized by a training result of the AI model. For example, during a learning process, the plurality of weight values may be refined to reduce or minimize a loss value or a cost value obtained by the AI model. An artificial neural network may include a deep neural network (DNN), and examples of the artificial neural network may include, but are not limited to, a convolutional neural network (CNN), a DNN, a recurrent neural network (RNN), a restricted Boltzmann machine (RBM), a deep belief network (DBN), a bidirectional recurrent deep neural network (BRDNN), and a deep Q-network.

Some embodiments of the disclosure may be implemented as a recording medium including computer-executable instructions, such as a computer-executable program module. A computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information, such as computer-readable instructions, data structures, program modules, or other data. The communication medium typically includes computer-readable instructions, data structures, program modules, or other data of a modulated data signal.

Also, the term "unit" used herein may be a hardware component, such as a processor or a circuit and/or a software component executed in a hardware component, such as a processor.

Throughout the disclosure, the expression "at least one of a, b or c" indicates only a, only b, only c, both a and b, both a and c, both b and c, all of a, b, and c, or variations thereof.

While the disclosure has been particularly shown and described with reference to embodiments thereof, it will be understood that the embodiments of the disclosure have merely been used to explain the disclosure and various changes in form and details may be made therein without departing from the spirit and scope of the disclosure. It will be understood that the embodiments of the disclosure should be considered in a descriptive sense only and not for purposes of limitation. For example, each component described in a single type may be executed in a distributed manner, and components described distributed may also be executed in an integrated form.

The scope of the disclosure is not defined by the detailed description of the disclosure but by the claims, and all modifications or alternatives derived from the scope and spirit of the claims and equivalents thereof fall within the scope of the disclosure.

What is claimed is:

1. A method of a server modifying a speech recognition result provided from a device, the method comprising:
   receiving, by the server, from the device external to the server, text output from an automatic speech recognition (ASR) model of the device;
   identifying, by the server, at least one domain related to subject matter of the received text;
   selecting, by the server, from among a plurality of text modification models included in the server, at least one text modification model of the at least one domain, wherein the at least one text modification model is an artificial intelligence (AI) model trained to analyze text related to the subject matter;
   modifying, by the server, the received text to generate modified text using the at least one text modification model; and
   providing, by the server, the modified text to the device, wherein the identifying of the at least one domain comprises:
   receiving, by the server, from the device, a first domain reliability of the received text calculated by the device;
   calculating, by the server, a second domain reliability of the received text; and
   identifying the at least one domain related to the subject matter of the received text, based on the first domain reliability and the second domain reliability.

2. The method of claim 1, wherein the at least one text modification model is an AI model trained by using the text output from the ASR model and ground truth text of a preset domain.

3. The method of claim 1, wherein the at least one text modification model is an AI model trained to analyze text related to the subject matter by using pieces of text output from different ASR models.

4. The method of claim 1, wherein the plurality of text modification models respectively correspond to a plurality of domains, and
   wherein the selecting of the at least one text modification model comprises selecting the at least one text modification model corresponding to the at least one domain from among the plurality of text modification models corresponding to the plurality of domains.

5. The method of claim 1, wherein the receiving of the text comprises receiving a text stream output from the ASR model, and
   wherein the identifying of the at least one domain comprises identifying the at least one domain by accumulating the text stream in units of sections.

6. The method of claim 5, wherein the identifying of the at least one domain comprises identifying the at least one domain by calculating domain reliabilities of the text stream accumulated in units of sections.

7. The method of claim 1, wherein the identifying of the at least one domain comprises classifying the received text into a plurality of sections and identifying a plurality of domains respectively related to the plurality of sections,
   wherein the selecting of the at least one text modification model comprises selecting the plurality of text modification models corresponding to the plurality of domains, and
   wherein the modifying of the received text comprises respectively modifying pieces of text of the plurality of sections, by using the plurality of text modification models.

8. The method of claim 1, further comprising selecting, by the server, a domain identification module from among a plurality of domain identification modules in the server, based on the first domain reliability,
   wherein the calculating of the second domain reliability comprises calculating the second domain reliability of the received text by using the domain identification module.

9. The method of claim 1, wherein the ASR model of the device is an end-to-end ASR model, and
   wherein each text modification model among the plurality of text modification models included in the server is a sequence-to-sequence model for speech recognition.

10. A server for modifying a speech recognition result provided from a device, the server comprising:
    a communication interface;
    a memory storing one or more instructions; and
    a processor configured to execute the one or more instructions to control the server to:

receive, from the device external to the server, text output from an automatic speech recognition (ASR) model of the device, identify at least one domain related to subject matter of the received text, select at least one text modification model of the at least one domain, wherein the at least one text modification model is an artificial intelligence (AI) model trained to analyze text related to the subject matter, from among a plurality of text modification models included in the server, modify the received text to generate modified text using the at least one text modification model, and provide the modified text to the device, wherein the processor is further configured to execute the one or more instructions to receive, from the device, a first domain reliability of the received text calculated by the device, calculate a second domain reliability of the received text, and identify the at least one domain related to the subject matter of the received text based on the first domain reliability and the second domain reliability.

11. The server of claim 10, wherein the at least one text modification model is an AI model trained by using the text output from the ASR model and ground truth text of a preset domain.

12. The server of claim 10, wherein the at least one text modification model is an AI model trained to analyze text related to the subject matter by using pieces of text output from different ASR models.

13. The server of claim 10, wherein the plurality of text modification models respectively correspond to a plurality of domains, and wherein the processor is further configured to execute the one or more instructions to select the at least one text modification model corresponding to the at least one domain from among the plurality of text modification models corresponding to the plurality of domains.

14. The server of claim 10, wherein the processor is further configured to execute the one or more instructions to receive a text stream output from the ASR model and identify the at least one domain by accumulating and using the text stream in units of sections.

15. The server of claim 14, wherein the processor is further configured to execute the one or more instructions to calculate domain reliabilities of the text stream accumulated in units of certain sections and identify the domain related to the text stream.

16. The server of claim 10, wherein the processor is further configured to execute the one or more instructions to classify the received text into a plurality of sections, identify a plurality of domains respectively related to the plurality of sections, select the plurality of text modification models corresponding to the plurality of domains, and respectively modify pieces of text of the plurality of sections by using the plurality of text modification models.

17. The server of claim 10, wherein the processor is further configured to execute the one or more instructions to select a domain identification module of a plurality of domain identification modules in the server based on the first domain reliability and calculate the second domain reliability of the received text by using the domain identification module.

18. The server of claim 10, wherein the ASR model of the device is an end-to-end ASR model, and wherein each text modification model among the plurality of text modification models included in the server is a sequence-to-sequence model for speech recognition.

* * * * *